United States Patent
Sher et al.

(10) Patent No.: US 6,197,397 B1
(45) Date of Patent: *Mar. 6, 2001

(54) ADHESIVES HAVING A MICROREPLICATED TOPOGRAPHY AND METHODS OF MAKING AND USING SAME

(75) Inventors: Frank T. Sher, St. Paul; Larry A. Meixner, Woodbury, both of MN (US); Francis V. Loncar, Jr., Hudson, WI (US); Clyde D. Calhoun, Stillwater, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,844

(22) Filed: Dec. 31, 1996

(51) Int. Cl.⁷ .............. B32B 33/00; B32B 9/00; B05D 5/10; B29C 47/00
(52) U.S. Cl. .............. 428/42.3; 428/42.2; 428/42.3; 428/40.1; 427/208.6; 156/245; 156/246
(58) Field of Search .............. 428/42, 202, 343, 428/344, 345, 352, 354, 198, 199, 180, 40, 200, 173, 214, 317.1, 143, 147, 159; 156/231, 245, 246; 427/198, 199, 200, 276, 197, 208.6, 271

(56) References Cited

U.S. PATENT DOCUMENTS

| | | | |
|---|---|---|---|
| 3,301,741 | 1/1967 | Henrickson et al. | 161/119 |
| 4,023,570 | 5/1977 | Chinai et al. | 128/290 |
| 4,397,905 | 8/1983 | Dettmer et al. | 428/180 |
| 4,861,635 | 8/1989 | Carpenter et al. | 428/40 |
| 4,968,562 | 11/1990 | Delgado | 428/402 |
| 4,994,322 | 2/1991 | Delgado et al. | 428/343 |
| 5,268,228 | 12/1993 | Orr | 428/343 |
| 5,296,277 | 3/1994 | Wilson et al. | 428/40 |
| 5,298,791 | 3/1994 | Liberty et al. | 257/707 |
| 5,362,516 | 11/1994 | Wilson et al. | 427/207.1 |
| 5,437,754 | * 8/1995 | Calhoun | 156/231 |
| 5,449,540 | 9/1995 | Calhoun et al. | 428/42 |
| 5,462,765 | * 10/1995 | Calhoun et al. | 427/198 |
| 5,643,668 | * 7/1997 | Calhoun et al. | 428/354 |
| 5,650,215 | 7/1997 | Mazurek et al. | 428/156 |

FOREIGN PATENT DOCUMENTS

| | | | |
|---|---|---|---|
| 0 580 981 B1 | 5/1993 | (DE) . | |
| 0 279 579 | 2/1988 | (EP) . | |
| 0 459 059 A2 | 12/1991 | (EP) | C09J/7/02 |
| 1 511 060 | 10/1975 | (GB) . | |
| 3 243 677 | 10/1991 | (JP) . | |
| 8-193830 | 7/1994 | (JP) . | |
| 7-138541 | 5/1995 | (JP) . | |
| WO 97/18276 | 5/1997 | (WO) | C09J/7/02 |

OTHER PUBLICATIONS

Neschen "An Authority All Around the Picture" Brochure (Neschen Corp. Apr. 1997).
Patent Abstracts of Japan, vol. 018, No. 578 (1994).
Patent Abstracts of Japan, vol. 095, No. 007 (1995).
Patent Abstracts of Japan, vol. 096, No. 008 (1996).

* cited by examiner

Primary Examiner—Jeffrey Stucker
Assistant Examiner—Brett Nelson
(74) Attorney, Agent, or Firm—Dale A. Bjorkman

(57) ABSTRACT

Adhesives having a microreplicated topography are prepared from contacting a microembossed pattern to a layer of adhesive. When an adhesion interface is established between the layer of adhesive and a supporting substrate, the topography of the adhesive surface controls the performance of the adhesion interface. Articles having microreplicated adhesive surfaces are also disclosed that have an advantage of providing microchannels for fluid egress for an effective period of time. Multiple microembossed patterns produce microreplicated adhesive surfaces having both microchannels for fluid egress and pegs for improved adhesive properties.

23 Claims, 4 Drawing Sheets

ADHESIVES HAVING A MICROREPLICATED TOPOGRAPHY AND METHODS OF MAKING AND USING SAME

FIELD OF INVENTION

This invention relates to adhesives having a controlled topographical surface of microchannels and the methods of making and using them.

BACKGROUND OF INVENTION

Pressure sensitive adhesives are useful for the joining of two materials. The interfaces between the adhesive and the materials are vital to the performance of the joined materials. The loss of adhesion at either interface can doom the usage of the materials.

One example of an adhesion interface requiring peak performance is a durable film displaying image graphics adhered to substrates, where the film is a backing material upon which an adhesive layer is added for adhesion to the substrate. Adhesion of a large image graphic film to substrates encounters the problem of entrapped air between the film and the substrate. Anyone who has ever attempted to hang wallpaper can appreciate the frustration that can arise when entrapped air beneath an adhesive-backed film can not be removed easily. The most common solutions to this problem are to remove and reapply the film or to perforate the film to release the entrapped air. Multiple attempts to adhere the same film to a substrate can compromise the pressure sensitive adhesive or increase the probability of uneven or misaligned film on the substrate. Perforating a film mars its appearance. The removal of air bubbles is also labor intensive.

Prior approaches have addressed facile adhesion of image graphics film to substrate by concentrating on specialized topographical constructions of the pressure sensitive adhesive. Commercially superior pressure sensitive adhesives for image graphics are available on image graphic films by 3M of St. Paul, Minn., USA. Pressure sensitive adhesives having this utility are disclosed in a variety of patents. Representative examples of patents describing such materials include U.S. Pat. Nos. 5,296,277 and 5,362,516 (both Wilson et al.) and 5,141,790 (Calhoun et al.). These patents disclose how the adhesive's topography is built from the interface between the adhesive and the release liner. The principal topographical features in the adhesive surface are isolated protrusions from the adhesive surface with identified contact areas.

Another approach to topographical adhesives is the formation of ridges or recesses in a release or transfer liner to generate a temporary topography on the adhesive. For example, British Patent Specification 1,511,060 discloses a heat- and pressure sensitive adhesive on an impermeable backing that is formed by application of heat and pressure and a release liner having a specific topography or by coating the adhesive onto the release liner, whereupon the release liner is removed. Then, bonding of the adhesive to the desired substrate also requires a step of heat and pressure that adheres the adhesive layer to the substrate. This step is also required to improve the appearance of the final product. This complicated procedure of generating the adhesion of the layer to the backing and then generating the adhesion to the final substrate minimizes utility of the construction for use in large format graphics and other industrial requirements. Furthermore, the depth of the recesses used to create an effective temporary topography on the nontacky adhesive surface is at least 45 µm, and then only if the width of the recesses is at least 130 µm.

Another example of a temporary topography formed on an adhesive surface is disclosed in U.S. Pat. Nos. 5,344,681 and 5,449,540 (both Calhoun et al.). A segmented pressure-sensitive adhesive transfer tape is designed to prevent lateral flow of the adhesive prior to transfer but allows flow after transfer to form a continuous adhesive bond. The small adhesive segments have controllable thickness. An adhesive transfer tape comprises: a carrier with two opposed surfaces with one containing a series of recesses and the other being relatively smooth; a pressure sensitive adhesive being present in the recesses which are surrounded by an adhesive free area such that when the tape is wound about itself with the surfaces contacting and then unwound, adhesive transfers from the one surface to the other. Preferably, the recesses are formed by embossing and are in spaced-apart relationship. Preferably, they are oval, circular, polygonal or rectangular in cross section. Preferably, the adhesive is acrylic or rubber resin, pressure sensitive.

Another example of a temporary topography formed on an adhesive surface is disclosed in U.S. Pat. No. 5,268,228 (Orr). A double-sided adhesive-coated tape has fine grooves on one or both sides of the tape to facilitate air venting to minimize non-contact areas. The grooves in the tape are fine enough that, once the two surfaces to be bonded are in position, the grooves largely or completely disappear. Example 1 describes scribing lines through a protective sheet that placed grooves 70–150 microns deep in the underlying adhesive surface.

SUMMARY OF THE INVENTION

Desirable topographical adhesives face three limiting conditions to solve problems in the art of adhering one material to another, especially large format graphics on supporting substrates having large flat surfaces interrupted by rivets, seams, and the like:

(1) An adhesive without channels provides no effective route for egress of fluids in the X-Y dimensions of the interface between the adhesive and the substrate, especially if the backing material, adhesive, and/or the substrate are fluid-impermeable. But if the channels are too large, a path of fluid egress could also be a path of passive ingress of the same or other fluids.

(2) The backing material, and especially its outer imagable surface, can not be adversely affected by the adhesive topography chosen, thereby limiting the size of the channels in the adhesive and also limiting the method of construction. The backing material needs a flat, uniform surface for imaging and other aesthetic reasons. The formation of large channels into the laminate of backing and adhesive will adversely disrupt the flat, uniform surface of the backing material. Also, adhesive topographies that are too large will create undesired undulations or other imperfections in the appearance of the backing material on the final substrate. Such undulations or other imperfections make the image graphic unacceptable for most commercial markets.

(3) The area of adhesive actually contacting the substrate and the holding power (i.e., shear and peel adhesion) of the adhesive affect bonding performance of the backing material to the substrate. If either the holding power is too weak or the area of the adhesive contact is too small, or both, the performance of the adhesive is entirely inadequate. Microspheres or other large abrupt surface patterns have been used to reduce the area of adhesive surface on the substrate, either temporarily or permanently, which can affect holding power of the adhesive or area of adhesive contact. If the size of the surface features is increased, air channels in the topography are formed but there is insufficient adhesive interface remaining to provide effective permanent adhesion.

While the air bubble and fluid egress problems associated with large format graphics are easy to understand, these problems also exist for small graphics and decals where speed of application or applications without pre-masking are significant for economic or manufacturing considerations.

The problem of fluid egress is even more acute whenever the two materials contacting the adhesive effectively inhibit any egress in the Z axis through either or both materials. Further if the materials are inflexible as well as fluid impermeable, such as metallic plates, there is no avenue that can be created, during application, for fluid egress.

The art needs a different approach to control adhesion at the interfaces between a pressure sensitive adhesive and two materials within the three enumerated limiting conditions. Indeed, the art needs to engineer the geometry of the adhesive surface to provide a controlled topography of the adhesive surface at any adhesion interface where particular performance is required.

For this invention, that particular performance should include the provision for fluid egress in the X-Y dimensions of the adhesive interface but without adversely affecting the desired appearance of the backing material which should remain flat and uniform for imaging, but preferably conformable during use. Further, fluid egress should be reconciled with adhesive bond strength for maintaining an adhesive interface.

One aspect of the present invention provides a means of controlling the topography of an adhesive surface, comprising contacting a microembossed pattern to a layer of adhesive and forming a microreplicated surface, such that when an adhesion interface is established between the layer of adhesive and a supporting substrate, the topography of the adhesive surface controls the performance of the adhesion interface between that adhesive and the supporting substrate.

"Adhesive" means any form of adhesive that has pressure sensitive adhesive properties at the time of application to a supporting substrate. As identified by the Pressure Sensitive Tape Council, a pressure sensitive adhesive requires firm adhesion to a variety of dissimilar surfaces upon mere contact without need of more than finger or hand pressure.

Another aspect of the present invention provides a microreplicated adhesive surface formed by microreplication from any contacting technique such as casting, coating, or compressing techniques. Microreplication can be achieved by at least any of (1) casting using a tool having a microembossed pattern, (2) coating of an adhesive onto a release liner having that microembossed pattern, or (3) passing through a nip roll to compress pressure sensitive adhesive against a release liner having that microembossed pattern. Desired embossing topography can be formed in tools via any of a number of well-known techniques, selected depending in part upon the tool material and features of the desired topography. Illustrative techniques include etching (e.g., via chemical etching, mechanical etching, or other ablative means such as laser ablation or reactive ion etching, etc.), photolithography, stereolithography, micromachining, knurling (e.g., cutting knurling or acid enhanced knurling), scoring or cutting, etc.

The microreplicated topography resides on at least one major surface of the pressure sensitive adhesive and can optionally reside on both major, opposing surfaces of the adhesive affecting the properties of the interface(s) in the same or different manners, as desired by those skilled in the art.

When a microembossed liner is used, the liner can be a release liner (e.g., a releasable storage liner for the adhesive or a transfer liner for moving the adhesive from one location to another) or a tape backing on a self-wound roll that also serves as a liner, such that the microembossed surface of the tape backing microreplicates the surface of the adhesive exposed as the tape is unwound.

"Microembossed" means a topography on the liner or the casting tooling having an effective three-dimensional pattern that generates a maximum difference of less than about 45 $\mu$m in surface planar dimension in a continuous adhesive. The pattern can be interconnected or continuously parallel.

"Interconnected" means that at least two three-dimensional features in the microembossed pattern intersect causing the microreplicated formation of an intersection of the inverse of such three-dimensional features in the adhesive surface.

"Microreplicated adhesive" means adhesive having a topography in at least one major, substantially continuous surface that is essentially, but not necessarily perfectly, the inverse of the microembossed pattern to which the adhesive surface is contacted and has a contact area of at least about 35%.

"Pattern" means any formation of embossings that can utilize any theory of geometry, including without limitation, Euclidian geometry and fractal geometry.

Optionally, the microembossed patterns can be multiple. "Multiple" means two or more embossing patterns are superimposed on the liner to create a complex pattern of differing depths or heights of embossing to form the microreplicated adhesive having a complex pattern of differing depths or heights.

Another aspect of the present invention is an article having a microreplicated adhesive of the present invention.

The microembossed liners, tools, or nip rolls used to make microreplicated adhesive of the present invention can provide a vast array of microreplication combinations given the multitude of microembossed patterns, the multiplicity of embossings, and the variety of materials available.

A feature of microreplicated adhesives of the present invention is that the microembossed pattern is retained for an effective period of time on the microreplicated adhesive surface during intended use. The retention of microreplication can range from minutes to years depending upon the rheology of the pressure sensitive adhesive chosen and the conditions of application. Fluid egress may only be desired for limited times.

The invention not only provides a three-dimensional topography for pressure sensitive adhesives, but because of the unusual properties of pressure sensitive adhesives, their flow characteristics can be engineered. Therefore, the invention also contemplates the effective use of the pressure sensitive adhesive chemistry and substrate application techniques to control the fourth dimension, how long after substrate application the surface of the adhesive remains three-dimensional. The topography need not be permanent. For example, it can be desired to collapse any portion of the adhesive interface after sufficient fluid egress is completed.

Another feature of the microreplicated adhesive topography is the ability to control the engineering of the adhesive surface for desired uses, such as air bleeding from large image graphics, plasticizer migration routes from plastic materials, and other applications that require fluid transport in the X-Y dimensions of the adhesive interface(s) rather than the Z axis from the surface of the adhesive. In other words, aerodynamics of the adhesive interface can be engineered as required.

Another feature of the microreplicated adhesive, when using multiple microembossed patterns, is the ability to control the types of materials introduced into recesses of differing depths in the topography for complex adhesion usages, such as positionability as that disclosed in U.S. Pat. Nos. 5,296,277 and 5,362,516 (both Wilson et al.) and 5,141,790 (Calhoun et al.) and U.S. patent application Ser. No. 08/559,037 (Keller et al.) filed Nov. 15, 1995, the disclosures of which are incorporated by reference therein.

An advantage of the present invention is the creation of an engineered adhesive surface that serves specific intended uses for a controlled period of time when transferred or adhered to another material.

Another advantage of the present invention is a pressure sensitive adhesive that provides effective fluid egress without adversely affecting the appearance of the backing material which that adhesive adheres to a substrate.

Another advantage of the present invention is the ability of the adhesive surface(s) to exhaust fluids such as gases, entrapped air, plasticizers, or moisture from the plane of the adhesive surface independent of specialized compositions or formulations of the adhesive.

Another advantage of the present invention is the formation of the same or different adhesive topographies to each of the opposing major surfaces of the adhesive. For example, one adhesive interface could provide plasticizer migration from one engineered topography and the opposing major surface could provide fluid egress from a second engineered topography.

Another advantage of the present invention is the ability of the adhesive surface(s) to permit controlled ingress of fluids at a desired time to affect the adhesive interface(s), such as to facilitate removal, alter surface characteristics, provide additional remedial treatments, and the like.

Other features and advantages will become apparent from the embodiments of the invention described in relation to the following drawings.

EMBODIMENTS OF INVENTION

Figure 1:
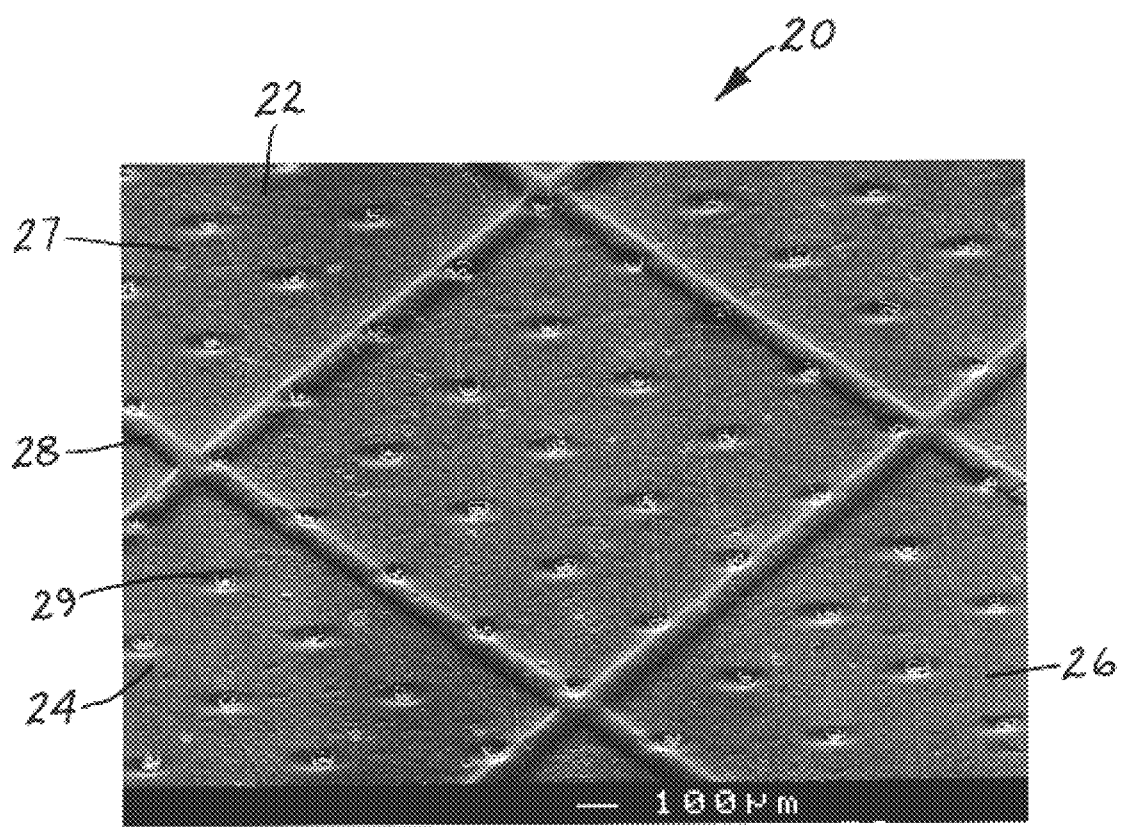
FIG. 1 is a scanning electron micrograph of a double microembossed liner that has been used to make an adhesive surface of the present invention.

FIG. 1 shows an example of the complex topography that can be created on liners. This scanning electron micrograph shows a liner 20 having a surface 22 with one pattern 24 of embossings and optionally a second pattern 26 of embossings. More than one optional pattern can be added according the techniques disclosed in U.S. Pat. No. 5,897,930 (Calhoun et al.), the disclosure of which is incorporated herein.

A careful viewing of FIG. 1 shows pattern 24 comprising both relatively planar lands 27, i.e., large squares that have been depressed from the initial surface 22 of liner 20 and a series of ridges 28 formed from the material moved from the lands 27 during the embossing process. Pattern 26 forms an array of depressions 29.

If multiple embossing patterns are desired, the manufacturing process reverses the order of embossings, with the required pattern(s) coming last. The manufacturing of the double embossed liner 20 actually requires the formation of the second embossing pattern 26 first, followed by the formation of the required first embossing pattern 24, second. Between the time of making the two embossing patterns, a desired material can be introduced into optional second embossing pattern 26, such as glass beads, in a manner as disclosed in U.S. Pat. No. 5,296,277 (Wilson et al.), incorporated by reference herein.

Figure 2:
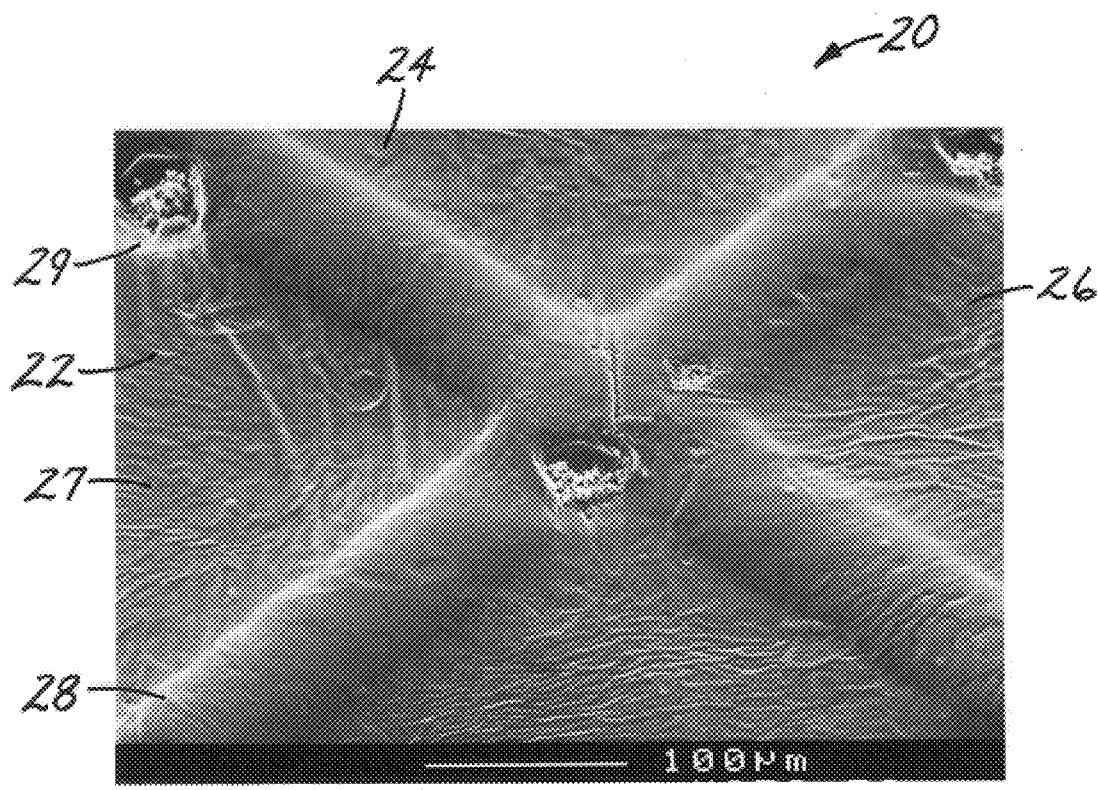
FIG. 2 is a scanning electron micrograph of the double microembossed liner of FIG. 1 at a higher magnification.

The resulting multiple microembossed liner 20 has a total area "T", a first area "A" for lands 27 created during embossing of pattern 24, and an area "B" for ridges 28 created during embossing of pattern 24, and an area "C" for depressions 29 residing in both lands 27 and ridges 28. FIG. 2 shows how one depression 29 can reside in a ridge 28. Thus, T=A+B and all of area C resides within either area A or B, or both.

The patterns 24 and 26 can be varied according to requirements in the art recognizing that the patterns are superimposed on one another. For example, in FIG. 1, lands 27 are discontinuous, because separate projections on the tooling for forming pattern 24 do not intersect with one another. Likewise, depressions 29 are discontinuous because separate projections on the tooling for forming pattern 26 do not intersect with one another.

The result of pattern 24 creates separated lands 27 from one another, and the result of pattern 26 creates separated depressions 29 from one another. The interconnected ridges 28 are a by-product of the embossing of separated lands 27.

In other words, the topography of the tool(s) is an obverse image of the final topography of the microreplicated adhesive, with the liner 20 serving as the inverse image for transferring the image of the tool(s) to the microreplicated adhesive. Therefore, the topography(ies) of the embossing tool(s) for liner 20 is essentially the topography of the microreplicated adhesive.

For the embodiment of adhesive to be produced from patterns 24 and 26, the percentage area of lands 27 to surface 22 (A to T) can range from about 35% to about 99%. Desirably, the percentage can range from about 50% to about 98%. Preferably, the percentage can range from about 60% to about 97%. More preferably, the percentage can range from about 70% to about 96%. Most preferably, the percentage of A to T can range from about 85% to about 95% to provide adequate fluid egress without adversely affecting adhesion to the supporting substrate. In other words, the percentage of A to T essentially determines contact area for the microreplicated adhesive on the supporting substrate. The percentage areas, respectively, of interconnected ridges 28 to surface 22 (B to T) are the remainders, respectively.

The percentage area of depressions 29 to surface 22 (C to T) can range from about 1% to about 70%. Preferably, the percentage can range from about 2% to about 25%. Most preferably, the percentage of C to T can range from about 3% to about 15% because of a balance of repositionability of the adhesive to final adhesive bond strength.

These percentages expressed with respect to the liner 20 cause approximately the same percentages on the inverted topography of the microreplicated adhesive. However, as described in U.S. Pat. No. 5,296,277 (Wilson et al.), the planar adhesive surface of their pegs is important. Therefore, the present invention is not limited by these percentages concerning the area of depressions 29 when creating the volume of depressions 29 or the geometry used to achieve those depressions. In other words, the depressions 29 can assume any solid geometric desired by those skilled in the art, within the percentage areas expressed above.

The embossing of pattern 24 to create lands 27 moves material into ridges 28. Like the formation of mountains from the movement of large land masses, ridges 28 rise from surface 22. While the depth of embossing of lands only results in a depth of a few micrometers, ridges rise from surface 22 to a height ranging range from about 3 to about 45 $\mu$m, preferably from about 5 to about 30 $\mu$m, and most preferably from about 6 to about 20 $\mu$m.

The depth of embossings for optional pattern 26 can range from about 4 to about 200 $\mu$m, preferably from about 8 to about 100 $\mu$m, and most preferably from about 10 to about 30 $\mu$m. Because the embossing of pattern 26 occurs before the embossing of pattern 24, the depths identified here are cumulative effect of both embossings, not necessarily the height of embossing tool.

Moreover, it should be apparent to those skilled in the art that the size of the embossing tooling needed may exceed the depth of embossing desired because of viscoelastic properties of the liner 20 being embossed.

The "sidewalls" of embossings for any of pattern 24, pattern 26, or any combination of them, can be any shape desired, ranging from a constant radius of curvature to any polygonal shape of at least 2 surfaces within the pattern 24 or 26. Nonlimiting examples of shapes of embossing, in cross-section, include curved, rectangular, trapezoidal, triangular, bimodal, and the like. U.S. Pat. No. 5,296,277 (Wilson et al.) describes some of the variables to be considered when forming depressions 29 in order to provide pegs in the microreplicated adhesive.

The width of embossings in any of pattern 24, pattern 26, or any combination of them, can vary as needed. For example, in FIG. 1, the width of embossings that create lands 27 and depressions 29 are relatively uniform for surface 22. However, the pattern can vary across surface 22 for fluid egress, not unlike a tributary-river configuration in a watershed.

For example, to create microchannels for fluid egress, one could use a liner 20 having a pattern 24 creating ridges 28 having a final width, after viscoelastic properties have reached equilibrium, of less than about 200 $\mu$m and preferably from about 50 to 120 $\mu$m. The ridges 28 in FIG. 1 are about 100 $\mu$m wide.

Precision of topographical formation of liner 20 can be achieved using a variety of machining techniques. The machine tool industry is capable of creating tools with any pattern desired by those skilled in the art. Euclidean geometric patterns can be formed with any pattern of size, shape and depth of embossing projection in any number of steps.

Tools can range from planar presses to cylindrical drums to other curvilinear shapes, depending on how it is desired to employ the embossing steps.

Nonlimiting examples of sources of tooling include commercial sources of photolithographic printing plates and cylinders, precision engraved plates and cylinders, laser machined plates and cylinders, and the like.

Figure 3:
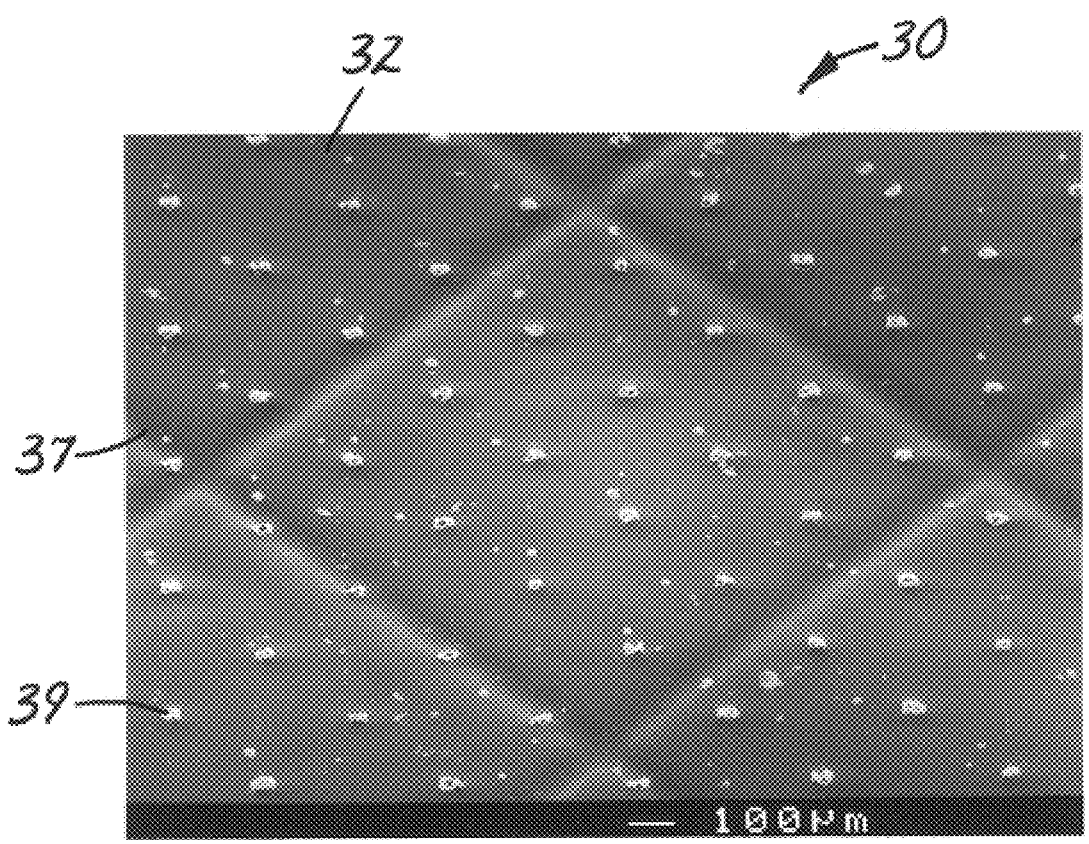
FIG. 3 is a scanning electron micrograph of a microreplicated adhesive surface of the present invention.
Figure 4:
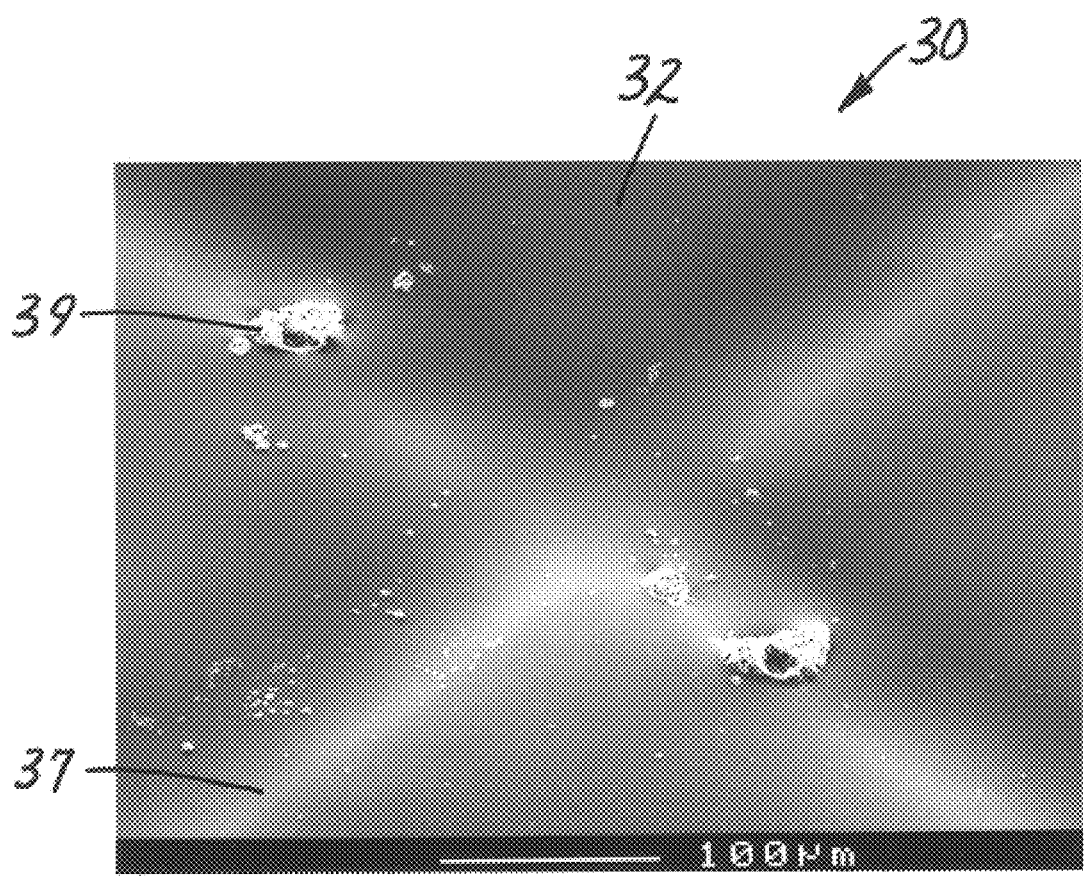
FIG. 4 is a scanning electron micrograph of the microreplicated adhesive surface of FIG. 3 at a higher magnification.

FIG. 3 shows a scanning electron micrograph of a layer 30 of microreplicated adhesive prepared from liner 20 seen in FIG. 1.

The adhesive layer 30 has a surface 32 having a topography essentially replicating the inverse of the topography of surface 22 caused by patterns 24 and 26. As explained above how the transfer of topography from tooling to liner to adhesive proceeds, FIGS. 1 and 3 provide photographic proof of the essential replication of topography during transfer. The topography of liner 20 therefore can determine the resulting topography of surface 32 of adhesive layer 30 that fill the recess(es) of microembossed liner 20.

Surface 32 has topographical features of a series of interconnected microchannels 37 essentially matching ridges 28 and an array of optional pegs 39 essentially matching depressions 29. The duration of microchannels and pegs depend on the chemistry of the adhesive chosen and the conditions of application.

Layer 30 can be coated in any thickness that is greater than the height of ridges 28 of liner 20. Desirably, the thickness can be at least about 5 $\mu$m. Preferably, for image graphic applications on vertical supporting substrates, the thickness can range from at least about 20 $\mu$m to about 50 $\mu$m.

Adhesives can be selected from a variety of conventional adhesive formulations to achieve the topography of surface 32.

Nonlimiting examples of adhesives include pressure sensitive adhesives, hot melt or heat activated adhesives that are pressure sensitive at the time of application such as pressure sensitive adhesives disclosed in U.S. Pat. No. 4,994,322 (Delgado et al.); U.S. Pat. No. 4,968,562 (Delgado); EPO Publication 0 570 515; EPO Publication 0 617 708; pressure sensitive adhesives disclosed in U.S. Pat. Nos. 5,296,277 and 5,362,516 (both Wilson et al.) and 5,141,790 (Calhoun et al.) and U.S. patent application Ser. No. 08/559,037 (Keller et al.), all incorporated by reference and any other type of pressure sensitive adhesive disclosed in Satas, et al., *Handbook of Pressure Sensitive Adhesives,* 2nd Ed. (Von Nostrand Reinhold, N.Y., 1989), the disclosure of which is incorporated by reference.

Chemistry and polymer physics of the adhesive can be used to control the fourth dimension, duration, of three-dimensional microreplicated adhesives of the invention. Understanding the rheology, such as creep compliance, of an adhesive can assist in controlling how quickly or if the microchannels 37 close after application.

Layer 30 of adhesive can cover all or a part of surface 22 of liner 20. The remaining portions of surface can be covered by other adhesive formulation(s) or left exposed for a pattern of microreplicated adhesive on a film. Pattern coating of adhesives can be found in PCT Patent Publication WO96/15715 (Yasis et al.), the disclosure of which is incorporated by reference herein.

For example, if one desired to have differential rheological properties on a given film, one could pattern coat adhesive layers, such as concentrically, in order to control how quickly certain portions of the microchannels 37 close. In the tributary-river paradigm, the adhesive layer pattern coated at the relative interior of the surface 32 could flow more quickly and close off microchannels to fluid ingress while microchannels of the relative perimeter of the surface 32 permit continued "drainage" of fluids from the interior of adhesive interface toward the perimeter.

Other materials besides adhesives can be used to fill one of the multiple embossed patterns if adhesive is used to fill other(s) of the multiple embossed patterns. For example, non-adhesive protrusions can be formed in, or different adhesive formulations can be filled into, depressions 29. Because pattern 26 is embossed before pattern 24 is embossed, the non-adhesive material or different adhesive formulation is added to depressions 29 after the embossing of pattern 26 and before the embossing of pattern 24. Then, layer 30 is coated over surface 22, resulting in a layer 30 of adhesive having non-adhesive protrusions 39 thereon.

Non-adhesive protrusions can be constructed from any material that can utilize the topographical features of the liner 20 and is compatible in performance with the adhesive and the desired adhesive use. Nonlimiting examples of non-adhesive materials include those materials disclosed in the Calhoun et al. and Wilson et al. patents incorporated herein. The purpose of using such protrusions 39 can also be found in these patents.

Liner 20 can be any release or transfer liner known to those skilled in the art for use with adhesives and that is capable of being microembossed. Nonlimiting examples of liners include a variety of commercial materials from 3M of St. Paul, Minn. and other commercial manufacturers of liner products such as Rexam Release Corporation of Oakbrook, Ill. or Daubert Coated Products of Westchester, Ill. Such liners are typically polyethylene coated papers with commercial silicone release coatings; polyethylene coated poly (ethylene terephthalate) films with commercial silicone release coatings; or cast polypropylene films which can be embossed with pattern(s) while making such films, and thereafter coated with commercial silicone release coatings. Additional useful liners are identified in the Calhoun et al. and Wilson et al. patents.

Any film can be contacted to the major surface of adhesive opposite the major surface(s) of adhesive created by the topography of liner 20. Because the film is laminated to adhesive after the topography of adhesive 30 is microreplicated from liner pattern 24, and optionally, pattern 26, the appearance of an exposed major surface is not adversely affected by the topography of the microreplicated adhesive during use. With that advantage, film can be imaged using any commercial technique, including electrography, inkjet, screen printing, flexography, electronic cutting, or other imaging or graphic techniques.

Alternatively, both major surfaces of adhesive layer 30 can be microreplicated using the same or different liner(s) 20 to provide the same or different adhesive performance properties at the two different adhesive interfaces during use.

For example, different types of fluid egress can be desired from the different adhesive interfaces: namely, gaseous egress at one interface and liquidic egress at the other.

Another example is the formation of adhesive topography at the interface between the film and adhesive in order to specifically create a pattern in the film using the adhesive topography to achieve that pattern.

Yet another possible embodiment is the use of same or different adhesives having same or different topographies where two or more adhesives are laminated together before adhesion to the film and supporting substrate. With the chemistry of the different adhesives determined, one can provide through-channels in the X-Y dimensions of the adhesive-adhesive interface without affecting the adhesive bond strength of the adhesive laminate to the film or the supporting substrate.

Nonlimiting examples of films useful for contact with adhesive surfaces of the present invention include Controltac™ branded films commercially available from 3M, films disclosed in U.S. patent application Ser. No. 08/687, 271 foils, metallic plates, ceramic plates, polymeric sheets, vibration damping materials, reflective sheeting, retroreflective sheeting, top-coated materials, industrial tape backings, hypoallergenic tape backings, and combinations thereof Usefulness of the Invention Image graphic films are unexpectedly improved by the microreplicated adhesive surfaces of the present invention. Image graphic films having adhesive surfaces of the present invention can be used to ensure fluid egress for a predetermined period of time according to the rheology of the adhesives (creep compliance, modulus, etc.).

For example, one skilled in the art can control fluid egress but minimize fluid ingress at the adhesive interface by (a) selecting a suitable adhesive and (b) forming a topography according to the present invention, and (c) appropriately applying the adhesive to the supporting substrate. This provides air bleed during installation but afterwards seals the interface between the adhesive and the supporting substrate.

Alternatively, one skilled in the art can select an adhesive having a different rheology to maintain the topography of the adhesive surface for a longer period of time after initial installation to permit multiple reinstallations onto the same or different supporting substrate or to maximize available routes for fluid egress.

One can make image graphic films with two different types of adhesives in the differing depths of patterns on liner 20 for ease of installation of an image graphic film. This construction is an alternative to products described in the Calhoun and Wilson patents identified above but can function in similar manners.

Adhesive surfaces of the present invention improve economic value by reducing manufacturing costs, reducing labor costs during installation, and minimizing maintenance required by adhesive interface problems.

Adhesive surfaces of the present invention can tolerate lower temperature applications, where incomplete bonding of an adhesive to a substrate at the lower temperature is a problem because the adhesive is slow to "wet" the substrate surface. Over time, the extent of the adhesive contact can change, possibly entrapping air. Without microchannels provided by microreplicated adhesive surfaces of the present invention, the fluid can not egress.

Wavefront motion is usually used to apply murals or graphics to a supporting substrate. These graphics benefit from the adhesive topography of the present invention because, surprisingly, the microchannels of the adhesive not only promote fluid egress during adhesive application of the graphic to the substrate but also survive the application process that involves high transient pressures to provide routes of fluid egress for residual air pockets.

Further features, advantages, and embodiments are described in the examples.

Examples

Sample Analyses:

Liner and adhesive samples were evaluated using a JSM-6400 (JEOL, Tokyo, Japan) scanning electron microscopy, light microscopy with a JENA JENAVERT (Jena, Germany) incident light microscope or Bausch and Lomb stereo microscope (Bausch & Lomb, Rochester, N.Y.), or interferometry microscopy using a WYKO RST surface profiler (WYKO Corp., Tucson, Ariz.). A Surtronic 3P stylus profilometer (Rankd Taylor-Hobson, Inc., Leicester, U.K.) was also used for some liner evaluations.

Tests:

Peel Test: Adhesion tests were a modification of ASTM method D3330 (1992) and Pressure Sensitive Tape Council method PSTC-1 (1989). Caustic etched and acid desmut aluminum test panels (6061 T6, Q-Panel Co., Phoenix Ariz.) and painted aluminum test panels (Fruehauf, Indianapolis, Ind.) were cleaned with DuPont "PrepSol" and allowed to dry. Samples of pressure sensitive adhesive and film on liner were cut into 2.54 centimeter wide strips. The release liner was removed, and the strips were applied to the panels using either a PA-1 Hand Applicator (available from Minnesota Mining and Manufacturing Company (3M) St. Paul, Minn.) at a speed of about 2.5 centimeter/second or a Vanquisher roll laminator (Stoughton Machine and Manufacturing Co., Inc., Stoughton Wis.) at 40 psi gauge pressure and a speed of about 2.5 cm/second. A backing strip of 2.54 centimeter wide 3M Scotchcal™ Film Series 3650 adhesive film was laminated in registration onto each sample strip. The backing film prevented the sample films and pressure sensitive adhesive from excessively stretching during peel back testing. After 24 hours in a constant temperature and humidity room at 22° C. and 50% relative humidity or after 7 days at 66° C. followed by 24 hour equilibration in the constant temperature and humidity room, peel adhesion was measured as a 180 degree peel back at a crosshead speed of 30.5 centimeters per minute using a Lloyd 500 tensile tester (Lloyd Instruments, Segensworth Fareham England).

Creep Compliance Testing: A sandwich of pressure sensitive adhesive layer (about 125 microns thick) between two sheets of 48 micron thick poly(ethylene terephthalate) film was prepared by coating the pressure sensitive adhesive onto one sheet of the polyester film, drying at 66° C. to constant weight (at least about 20 minutes) to afford about ½ the test specimen thickness, and doubling over the coated construction. The test pieces were cut from this sandwich, and the average thickness (h) of the pressure sensitive adhesive layer was determined using a caliper gauge and subtracting the thickness of the polyester films. Two test pieces of equal size were die-cut and placed in the parallel plate creep compliance rheometer, one piece being on each side of the center plate, with an outer plate contacting the exposed surface of each. One end of the center plate was connected to a linear variable transducer, which measures the plate displacement (due to material flow) and outputs an electrical signal proportional to the displacement, to a recorder. The parallel plates were placed in horizontal arrangement and the two outer plates were then clamped firmly so as to compress the interposed layers approximately 10%. A hook was attached to the opposite end of the center plate with a flexible wire extending horizontally from the hook and then downward over a pulley, the outer plates being held in a fixed position. A suitable weight (sufficient to measurably deform the sample a distance no greater than its thickness) was attached to the free end of the wire, then the recorder was started. For these examples, the weight used to exert the stress (f) was 500 g. From the recorder, the time (t) and the displacement (X, i.e., strain) were read. The creep compliance at a given temperature was then calculated according to the equation:

$$J_{(t)} = 2AX/hf$$

where t is the time at which the measurement is taken, A is the area of one face of the pressure sensitive adhesive samples, h is the thickness of the adhesive mass, X is the displacement at time t (where X is less than h) and f is the force due to the mass attached to the wire connected to the middle plate. Where A is expressed in $cm^2$, h in cm, X in cm, and f in dynes, then the compliance value $J_{(t)}$ is given in $cm^2$/dyne. As an example, a creep compliance J value calculated at a time of 3 minutes is indicated here as $J_{(3\ min)}$. The weight may be removed after time t allowing the pressure sensitive adhesive to relax or recover. After some additional time t relax, the compliance may be determined again. As an example, if a weight is applied for 3 minutes and then removed, and the compliance determined after an additional 3 minutes, the relaxed J value is indicated here as $J_{(3\ min.+3\ min.\ relax)}$. A percent recovery under the test conditions may also be calculated: % recovery=$100\% \times [J_{(t)} - J_{(t+t\ relax)}]/J_{(t)}$.

Slide Test for Positionability: A horizontal glass plate was heated to 40–43° C. and cleaned with methyl ethyl ketone (MEK). A test sample (i.e., pressure sensitive adhesive on the indicated backing), approximately 2.5 cm by 7.5 cm, was draped flat onto the glass plate with the pressure sensitive adhesive side down for approximately 10 seconds. The end edge of the sample was lifted and pulled laterally. The test ratings are as follows:

1 sample slid freely
2 sample slid easily with some resistance
3 sample slid with considerable resistance because of adhesion to the plate, but could be lifted without damage
4 sample stuck to the plate and could not be repositioned without damage Hot Application/Reapplication Test: A horizontal glass plate was heated to 40–43° C. and cleaned with methyl ethyl ketone (MEK). A test sample, approximately 2.5 cm by 7.5 cm, was draped flat onto the glass plate with the pressure sensitive adhesive side down for approximately 10 seconds, and the edges were pressed with a finger with approximately 500 g "force" to uniformly contact the periphery (from the edge to about 0.5 cm inward) to the glass plate. The sample was then pressed by a finger around the periphery and toward the center of the sample to prevent the PSA from debonding and prevent the entire air pocket from moving to the edge of the sample. The sample applied in this fashion was then evaluated for presence or absence of trapped bubbles. The strip was slowly peeled off of the stage and reapplied in the same procedure. A third reapplication was also done. The test ratings are as follows:

"poor" sample showed trapped bubbles after the first application (indicating no detectable air release properties)

"fair" sample did not show bubbles after the first application, but did show bubbles after either the second or third reapplication "good" no bubbles were observed on any of the three application and reapplications (showing air release properties for the first application and showing retention of air release properties for the subsequent reapplications). Also, the microchannels in the pressure sensitive adhesive layer of samples rated "good" were still present after the first and second removal steps.

Cold Application Test: Test samples were premasked with SCPM-3 (3M) premask tape. Sample strips approximately 5 cm by 23 cm were cut from the premasked film samples. The samples and Fruehauf painted test panels were conditioned at the test temperature for at least 20 minutes. The sample strips were applied to the test panels using one pass of a PA-1 Hand Applicator maintained at a constant 45 degree angle during application and a speed of about 1.5 m/min. Constant application force was supplied by 2 kg, 4 kg, or 6 kg masses mounted on top of the squeegee. Immediately, the premask was removed from the applied strip at a 180 degree angle and a peel rate of approximately 1.5 m/min. The test panel with the applied films was then heated at 66° C. for 5 minutes to develop any blistering. The size and extent of the blistering was rated on a scale of 1 to 10, with 1 being no blistering and 10 being complete adhesion failure of the film sample. The appearance of the sample parallels the rating. Particularly good are ratings of less than or equal to 5–6 with a mass of 2 kg, 3–4 at 4 kg, and 1–3 at 6 kg.

Indent Panel Test: A circular indent was made in 0.7 mm thick aluminum test panel using a hemispherical drop hammer with a tip diameter of 2.5 cm. The indent was about 2.8 cm diameter at the plane of the panel and was about 0.6 cm deep. A 7.5 cm by 7.5 cm test sample to be tested was centered over the indent and applied flat onto the panel and taut over the indent. A PA-1 Hand Applicator with a protective sleeve (SA-1, available from 3M was used to press the sample onto the panel using a mass of about 1 kg. Then the film was pressed with a thumb into the depressed indent. At least 3 kg of mass was applied. The ability of the sample to conform into the indent and uniformly contact the depressed panel indent was rated as follows:

0 sample would not conform significantly into the indent against the entrapped air 1 sample could be pressed down into the indent to the extent of about 50%

2 sample could be pressed down to conform with much of the indent leaving small air bubbles 3 sample could be pressed down to conform slowly (greater than 5 seconds) and completely into the indent 4 sample could be pressed down to conform swiftly (less than 5 seconds) and completely into the indent Rivet Panel Test: A test sample was manually pressed over a 12 mm diameter by 2.5 mm high rounded rivet onto a Fruehauf flat panel with rivets by starting at the edges of the sample 3.8 cm from the center of the rivet. The sample was pressed down, using both thumbs, with thumb pressure (approximately 750 g for each thumb) at the periphery using a circular motion to entrap a large air pocket under the film. The film was then pressed in at the edge of the air pocket towards the rivet keeping thumbs at opposite sides of the rivet and making half-circular motions in alternating directions with decreasing radii to keep the thumbs along the margin of the pocket (approximately 750 g for each thumb). The force was limited so as not to burst the film. This procedure ensured that a large air pocket was formed under the sample and was prevented from being pushed under the film, to the sample edge by debonding of the pressure sensitive adhesive. The time required for dissipating the air pocket and conforming the film to within 2 mm of the rivet was determined. If a large air pocket remained after 5 minutes of working the film, the diameter of the air pocket was determined. Samples with best air dissipation generally required less than about 30 to 60 seconds to conform the film up to the rivet. Poorest samples entrapped about a 35 mm (or larger) air pockets after 5 minutes of working application.

Air Bleed Test: A circular test sample 4.4 cm diameter was applied with 4 passes of a rubber roller (specifications as indicated in the specific examples) onto an acrylic panel. The sample was centered over a 6.4 mm diameter hole in the panel. With the sample side up, the panel was sealed onto a gasket by clamping to center the hole over a recessed chamber in an air delivery stage. After 5 mins., the stage was connected to an air-line (45 cm$^3$ total volume) and initially pressurized to 50 inches (127 cm) of water as determined by a pressure gauge connected to the system. The system was closed by a valve, and the time for the pressure to fall to 25 inches (63.5 cm) of water was determined. Poorest samples, such as representative of films with pressure sensitive adhesive layers having no microchannels, showed no air bleed even after several days. For lower adhesion pressure sensitive adhesives, the initial pressure must be adjusted such that the sample does not appreciably debond from the panel.

Rivet/Corrugated Panel Test: A sample was applied by hand onto a 10 cm by 30.5 cm painted aluminum Fruehauf corrugated panel having four 12 mm diameter by 2.5 mm high rounded rivets. The sample was large enough to cover a substantial portion of the panel. The degree of ease of pressing the sample into the valleys and conformably onto the rivets to prevent air entrapment was evaluated.

Examples

Pressure Sensitive Adhesive Solution 1

An acrylic pressure sensitive adhesive solution (described as Adhesive Solution 1 in U.S. Pat. No. 5,296,277 and modified with 18.5 phr of a resin—Nirez™ 2019 from Arizona Chemical Co.) was prepared. The average 21° C., 3 minute creep compliance, $J_{(3\ min.)}$, of the pressure sensitive adhesive prepared from this solution was 0.53 sq. cm./dyne and the 21° C., relaxed creep compliance, $J_{(3\ min.+3\ min.\ relax)}$, was 0.08 sq. cm./dyne.

Pressure Sensitive Adhesive Solution 2

Isooctyl acrylate-acrylic acid (98:2) copolymer was prepared as a solution in ethyl acetate and heptane at a solids content of about 28%. The average 21° C., 3 minute creep compliance, $J_{(3\ min.)}$, of the pressure sensitive adhesive prepared from this solution was 1.64 sq. cm/dyne and the 21° C., relaxed creep compliance, $J_{(3\ min.+3\ min.\ relax)}$, was 0.52 sq. cm./dyne.

Pressure Sensitive Adhesive Solution 3

An acrylic pressure sensitive adhesive solution (described as Adhesive Solution 2 in U.S. Pat. No. 5,296,277 and containing 1 part of the crosslinker solution) was prepared at a solids content of about 25%.

Pressure Sensitive Adhesive Solution 4

Kraton 1107 resin (20 parts and available from Shell Chemical Company, Westbrook, Ill.), Escorez 1310LC (20 parts), and toluene (60 parts) were combined.

The average 21° C., 3 minute creep compliance, $J_{(3\ min.)}$, of the pressure sensitive adhesive prepared from this solution was 0.11 sq. cm./dyne and the 21° C., relaxed creep compliance, $J_{(3\ min.+3\ min,\ relax)}$, was 0.004 sq. cm./dyne.

Pressure Sensitive Adhesive Solution 5

A latex acrylic pressure sensitive adhesive (described in Example 1 of U.S. Pat. No. 4,629,663) was prepared at about 54% solids.

Pressure Sensitive Adhesive Solution 6

A latex pressure sensitive adhesive (prepared according to the procedures of U.S. Pat. No. 5,196,246 and containing about 72% by dry weight of the acrylic pressure sensitive adhesive component) was prepared. The average 21° C., 3 minute creep compliance, $J_{(3\ min.)}$, of the pressure sensitive adhesive prepared from this solution was 0.63 sq. cm./dyne and the 21° C., relaxed creep compliance, $J_{(3\ min.+3\ min.\ relax)}$, was 0.08 sq. cm./dyne.

Pressure Sensitive Adhesive Resin 7

A pressure sensitive adhesive similar to pressure sensitive adhesive 1, but without added crosslinker, was isolated from solution as 100% solids resin for hot melt coating.

Pressure Sensitive Adhesive Solution 8

A pressure sensitive adhesive solution (Adhesive Solution 2 of U.S. Pat. No. 5,296,277 modified such that the alkyl acrylate component was 2-methylbutyl acrylate and 1.8 parts of crosslinker solution was added) was prepared at a solids content of about 35–40%.

Pressure Sensitive Adhesive Solution 9

Pressure sensitive adhesive solution 1 (100 phr) was modified by adding 5 phr of Pycal 94 (available from ICI Americas, Wilmington, Del.).

Pressure Sensitive Adhesive Solution 10

Isooctyl acrylate-acrylic acid (94:6) copolymer was prepared as a solution in ethyl acetate and heptane at a solids content of about 45%. To 100 parts of the solution was blended 20 parts of Foral 85 (available from Hercules, Inc., Wilmington, Del.), 7.5 parts of Hercolyn-D (available from Hercules, Inc.), and 7.5 parts of Pycal 94 (available from ICI Americas). To 100 parts of the combined solution was added 1.5 parts of a solution of 5% crosslinker (described in U.S. Pat. No. 5,296,277) in toluene.

Examples 1–4

A release liner consisting of four layers with the core being 97 microns poly(ethylene terephthalate), 21–22 microns polyethylene with a matte finish on a back side layer, and 21–22 microns polyethylene with a glossy finish on the front side with a silicone release coating on the glossy side, was microembossed on the glossy side by passing the release liner between an 85 durometer, 15 cm diameter silicone rubber roll and a 15 cm diameter engraved metal roll. The engraved pattern on the metal roll was intersecting recessed lines (microgrooves) forming a square grid with the microgrooves at a 45 degree angle to the circumference of the roll. The nominal metal roll groove dimensions are listed in the table below. The silicone rubber roll and the engraved roll were heated by circulating oil through the rolls. The set temperatures for the oil heater are indicated in the table below. The rolls were forced together with about 22 N/mm nip force by air cylinders. The release liner was passed through this arrangement at about 1.6 cm/sec. This formed a pattern of continuous raised intersecting microridges (and essentially flat land areas between the raised ridges) on the glossy silicone-coated side of the release liner. The intersections were also raised. The ridges had a curved top and filleted junction with the base. Average ridge dimensions are listed in the table below. The ridges were spaced the same as the engraved pattern. A similar liner microembossed as described above was analyzed with time-of-flight secondary ion mass spectrometry (TOF-SIMS) using a pulsed 25 keV Ga$^+$ primary ion beam, with a beam diameter of about 1 micron, rastered over an area of 400×400 microns. A uniform silicone distribution was shown over the liner both on and off the microembossed ridge areas.

Pressure Sensitive Adhesive Solution 1 was coated onto each microembossed release liner and dried at 66° C. for 10 minutes to form an adhesive film about 32 microns thick. A control sample was prepared using a similar liner that had not been microembossed with ridges. The exposed adhesive side of these were laminated at room temperature to a 46 micron thick placticized, white flexible and conformable vinyl (PVC) film identical to that used in 3M™ Controltac™ Plus Graphic Marking Film Series 180-10. The lamination used a Vanquisher roll laminator (Stoughton Machine and Manufacturing Co., Inc., Stoughton Wis.) at 200 kPa (30 psi) gauge pressure and a speed of about 2.5 cm/second to afford an essentially flat construction. After removal of the release liner the exposed pressure sensitive adhesive surface had continuous recessed microchannels and intersections (corresponding to the microridges of the removed release liner) The average channel dimensions are listed in the table below. The results showed that the channels allowed air bubbles and large air pockets to be easily pressed out by hand during or after application of the film on a surface. Thus, the films could be applied much faster than the control film while retaining uniform appearance of the applied graphic film. The samples adhered well to the substrates and showed no signs of undesired edge lifting. The control sample with no microchannels required more careful application, otherwise air bubbles and an uneven appearing graphic resulted. Trapped air bubbles under the applied control film could not be pressed out.

TABLE 1

Data for Examples 1–4

| | Example 1 | Example 2 | Example 3 | Example 4 |
|---|---|---|---|---|
| Engraved Roll Groove Nominal Width (microns) | 75 | 75 | 75 | 0 |
| Engraved Roll Groove Nominal Depth (microns) | 50 | 25 | 25 | 0 |
| Engraved Roll Groove Spacing (mm) | 2.5 | 0.77 | 0.77 | 0 |
| Engraved Roll Set Temp. (° C.) | 110 | 104 | 110 | no emboss |
| Silicone Roll Set Temp. (° C.) | 121 | 113 | 121 | no emboss |
| Liner Ridge Width (microns) | 220 | 190 | 225 | 0 |
| Liner Ridge Height (microns) | 28 | 30 | 25 | 0 |
| PSA Channel Width (microns) | 195–240 | 150–190 | 200–220 | 0 |
| PSA Channel Depth (microns) | 23–30 | 23–25 | 15–19 | 0 |
| Slide Test Rating | 4 (poor) | 4 (poor) | 4 (poor) | 4 (poor) |
| Hot Application Test Rating | "good" | "good" | "good" | "poor" |
| Rivet Panel Test Results | 30 seconds | 10 seconds | 10 seconds | 39 mm after 5 min. |

Example 5

A liner was microembossed according to the general procedure of Examples 1–3 to afford an array of ridges similar to Examples 1–3, but having ridge dimensions of about 165 microns wide, 25–30 microns high, and ridge spacing of 2.5 mm (from a 15 cm diameter engraved roll with nominal groove dimensions of 75 microns wide and 50 microns deep, groove spacing of 2.5 mm. The set point temperatures of the oil heaters were 113° C. for the silicone roll and 107° C. for the engraved roll. The rolls were forced together with about 22 N/mm nip force by air cylinders. The release liner was passed through this arrangement at about 1.6 cm/sec.Pressure Sensitive Adhesive Solution 7 was hot melt coated at a temperature of 218° C. onto the liner to afford about a nominally 35 micron thick pressure sensitive adhesive layer. Analyses showed that the hot extruded pressure sensitive adhesive had filled the lands between the ridges and conformed well around and over the ridges. A 46 micron plasticized white PVC film (described in Examples 1–4) was laminated to the exposed pressure sensitive adhesive layer on the liner. The film construction had a Hot Application Test rating of "good" and an Indent Panel Test rating of 4 (excellent).

Examples 6–8

About a 68 g/m$^2$ basis weight polypropylene film was cast-microembossed onto a chilled grooved metal roll to afford two intersecting sets of parallel ridges forming essentially flat square or diamond shaped planar regions between the ridges. The microembossed surface was silicone coated to provide release. Pressure Sensitive Adhesive Solution 5 was coated onto the ridged release liner and dried at 66° C.

to afford at about a 64 micron thick layer of pressure sensitive adhesive. After lamination of the indicated conformable film, the pressure sensitive films was evaluated by the Air Bleed Test. The results, summarized in the table below, demonstrated the desired property of air bleed to allow small and large bubbles to be pressed out during or after the graphic film was applied. Samples were applied to glass plates, and after several days at room temperature, the pressure sensitive adhesive layers did not fully contact the glass in the recessed channel areas (i.e., the channels remained open). Samples showed air bleed properties when removed from the substrate and reapplied.

dried at 66° C. for 10 minutes to form a continuous tacky aggressive pressure sensitive adhesive layer. The approximate thicknesses of the dried PSA layers were: 30 microns for PSA 1, 28 microns for PSA 2, 36 microns for PSA 4, and 23 microns for PSA 6. The exposed side of the adhesive film on the doubly microembossed release liner was laminated to essentially impermeable flexible films using a roll laminator as described in Examples 1–3. The films included 46 micron plasticized white PVC described in Examples 1–3, 100 micron thick plasticized white PVC, 48 micron thick transparent poly(ethylene terephthalate), 100 micron thick polyethylene film, and impervious 15 micron thick aluminum

TABLE 2

Data for Examples 6–8

|  | Conformable Film | Liner Ridge/PSA Channel Spacing (mm) | Nominal Liner Ridge Height (microns) | PSA Channel Width | Surface Appearance | Rivet Panel Test | Air Bleed Test |
|---|---|---|---|---|---|---|---|
| Example 6 | 178 micron Teslin (from PPG) | 1.27 | 50 | 0.4 mm | Fair | 15–20 sec. | 17 sec. (175 g, 5 cm roller) 43 sec. (2.4 kg, 4.5 cm roller) |
| Example 7 | 46 micron plasticized PVC | 2.54 | 50 | 0.3 mm | Poor | 15 sec. | 6 sec. 175 g, 5 cm roller) |
| Example 8 | 46 micron plasticized PVC | 2.54 | 13 | 0.3 mm | Acceptable | — | 30 sec. (2.4 kg, 4.5 cm roller) |

Examples 9–33

A release liner as described in Examples 1–4 was microembossed with small pits on the glossy silicone-coated side and the pits filled with fine glass beads according to the procedure described in U.S. Pat. No. 5,362,516. The pits were about 70 microns diameter and 18–19 microns deep in a square lattice of 300 micron spacing. A second emboss pattern was imposed upon the release liner by passing the release liner between an 85 durometer silicone rubber roll and an engraved metal roll. The engraved pattern was recessed lines (microgrooves) with dimensions about 80 microns wide and 24 microns deep. The grooves were 1.3 mm apart and formed a square grid with grooves oriented 45 degrees to the circumference of the roll. The set point temperatures of the oil heaters were 110° C. for the silicone roll and 104° C. for the engraved roll. The rolls were forced together with about 22 N/mm nip force by air cylinders. The release liner was passed through this arrangement at about 1.6 cm/sec. This formed a pattern of continuous intersecting ridges on the glossy silicone-coated side of the release liner. The ridge shapes were similar to the ridges described in Examples 1–3. Average dimensions of the ridges were about 85 microns wide, 18–19 microns high, and spaced the same as the engraved pattern. The intersections of the ridges were 16–19 microns high on average. This pattern was superimposed on the first microembossed pattern and did not substantially change the first pattern, except where individual pits were raised to the top of a ridge or sheared at the side of a ridge (see FIGS. 1 and 2). The liner was analyzed with time-of-flight secondary ion mass spectrometry (TOF-SIMS) as in Examples 1–4. A uniform silicone distribution was shown over the liner both on and off the microembossed ridge areas.

The indicated pressure sensitive adhesive was coated onto the doubly microembossed release liner, which was then foil. The films were conformable to various degrees. The polyester and aluminum films did not have sufficient elongation to be evaluated with the Indent Panel Test. The pressure sensitive adhesives had average measured channel dimensions of about 80 microns wide and about 15–18 microns deep and a uniform array of 8–12 micron high protruding mounds of glass beads corresponding to the pits on the liner. Two types of controls were used for comparison: One type of control was prepared from a "pit-only liner" (i.e., the same liner material had only the filled pits of the first emboss, but no second-microembossed ridges); the second control types were constructions of Examples 1–3 prepared from "ridge-only liners" having no first-emboss pits. The resulting film/pressure sensitive adhesive laminates were evaluated with the Slide Test for positionability, Hot Application/Reapplication Test, Indent Panel Test, and Rivet Panel Test. The Peel Test was run on representative samples to indicate the range of adhesions (from moderate to high) exhibited with the pressure sensitive adhesives used. The samples removed after 7 days at 66° C. were examined for presence or absence of the microchannels. The results (Table 3) show that the constructions made with the doubly microembossed liner are more easily positionable (as indicated by Slide Test ratings of 1–3) than control samples prepared from the "ridge-only liners" without protruding mounds of glass beads (Slide Test ratings of 4—poor). The results also show the lateral (X-Y dimensions) air bleed properties of the microchanneled samples versus minimal air bleed properties for control samples prepared from the "pit-only liners."

The samples were also applied by finger pressure or by PA-1 Hand Applicator to flat substrates. Samples with the microchanneled pressure sensitive adhesive layer required no special application technique, were easily applied, and afforded evenly adhered graphic films with virtually no entrapped air bubbles. Any air pockets purposely formed by buckling the film were easily pressed out during application or after application. Air pocket elimination did not require that the air pocket be pressed as a bulge in the film to the edge of the sample (i.e., requiring pressure sensitive adhesive debond in adjacent areas as the pocket moves). The results also show that air bleed was in a lateral (X-Y dimensions) direction and did not require z-axis air dissipation through the films or lifting of the graphic film from the substrate. All samples adhered well to the substrates and showed no signs of undesired edge lifting. In comparison, the control samples prepared from the "pit-only liner" required great care to prevent entrapment of many air bubbles. The trapped bubbles and pockets under the control samples prepared from the "pit-only liner" could not be pressed out without lifting the graphic and pushing the bubble under the film, to the sample edge by debonding of applied sample was peeled off of the stage and subjected to 7 repeat applications, and each time an excellent uniform application was observed with no trapped bubbles. The pressure sensitive adhesive backed film of Example 27 was similarly subjected to 30 repeat applications with similar excellent results.

The surface profile of the film side of the laminate construction of Example 9 (using a liner with microridges of about 18–19 microns high) showed no evidence of the emboss pattern telegraphing through the thin conformable vinyl film when compared to the surface profile of Example 10 (first type of control with no microridges in the liner). The surface topography of the film side of both constructions varied by about 2 microns from the lowest to highest points.

TABLE 3

Data for Examples 9–33

| Ex. | PSA Solution | Film (gauge in μm) | Liner with Second Emboss Ridges | Peel Test, Painted Panel N/2.54 cm width 24 hr CTH | 7 days 66° C. | Channels on Peeled Sample? | Slide Test Rating | Hot Application/ Reapplication Test Rating | Indent Panel Test Rating | Rivet Panel Test Results |
|---|---|---|---|---|---|---|---|---|---|---|
| 9  | 1 | PVC (46) | Yes | 21 | 29 | Yes | 1–2 | "good" | 4 | 30 sec. |
| 10 | 1 | "        | No  |    |    |     | 1   | "poor" | 0 | 37 mm after 5 min. |
| 11 | 1 | PVC (100) | Yes |    |    |     | 3   | "good" | 3 | 30 sec. |
| 12 | 1 | "         | No  |    |    |     | 2–3 | "poor" | 0 | 42 mm after 5 min. |
| 13 | 1 | PET (46) | Yes | 12 | 22 | Yes | 2   | "good" | — | 45 sec. |
| 14 | 1 | "        | No  |    |    |     | 3   | "poor" | — | 38 mm after 5 min. |
| 15 | 1 | (100) polyolefin | Yes |  |  |  | 2 | "good" | 1–3 | 35 sec. |
| 16 | 1 | (100)    | No  |    |    |     | 1–2 | "poor" | 0 | 39 mm after 5 min. |
| 17 | 1 | aluminum (15) | Yes |  |  |  | 1 | "good" | — | 5–10 sec. |
| 18 | 2 | PVC (46) | Yes | 12 | 17 | No  | 1–2 | "good" | 1–2 | 15 sec. |
| 19 | 2 | "        | No  |    |    |     | 1–2 | "poor" | 0 | 35 mm after 5 min. |
| 20 | 2 | PVC (100) | Yes |    |    |    | 1–2 | "good" | 3 | 35 sec. |
| 21 | 2 | PET (48) | Yes | 7 | 12 | No | 1–2 | "good" | — | 25 sec. |
| 22 | 2 | Polyolefin (100) | Yes |  |  |  | 1–2 | "good" | 2 | 15 sec. |
| 23 | 2 | Polyolefin (100) | No |  |  |  | 1 | "poor" | 0 | 44 mm after 5 min. |
| 24 | 4 | PVC (46) | Yes | 23 | 34 | No | 3 | "good" | 3 | 10 sec. |
| 25 | 4 | "        | No  |    |    |    | 2 | "poor" | 0 | 35 mm after 5 min. |
| 26 | 4 | PVC (100) | Yes |    |    |    | 2 | "good" | 3 | 11 sec. |
| 27 | 4 | PET (48) | Yes | 4.1 | 5.0 | No | 3 | "good" | — | 18 sec. |
| 28 | 4 | Polyolefin (100) | Yes |  |  |  | 2 | "good" | 3 | 13 sec. |
| 29 | 6 | PVC (46) | Yes | 12 | 13 | Yes | 2 | "good" | 4 | 30 sec. |
| 30 | 6 | "        | No  |    |    |     | 1 | "poor" | 0 | 38 mm after 5 min. |
| 31 | 6 | PVC (100) | Yes |    |    |     | 2 | "good" | 4 | 25 sec. |
| 32 | 6 | PET (48) | Yes | 6 | 10 | Yes | 2 | "good" | — | 60–90 sec. |
| 33 | 6 | olefin (100) | Yes |  |  |  | 2 | "good" | 4 | 40 sec. | the pressure sensitive adhesive. The latter process was done with difficulty for many of the pressure sensitive adhesives.

Samples of Example 9 and Control Example 10 were subjected to the Air Bleed Test. Example 9 required 139 seconds while Control Example 10 showed no significant pressure drop after $5.26 \times 10^5$ seconds (greater than 6 days).

A 7.5 cm by 7.5 cm square sample of Example 14 was subjected to the Hot Application/Reapplication Test. The Examples 34–42

Film constructions were prepared according to the procedure of Example 9 using different engraved roll tooling groove dimensions or patterns and embossing conditions. The engraved groove pattern on the embossing rolls used for Examples 34–41 was a square grid oriented as in Example 9 and for Example 42 was a series of interconnected hexagons in a "honeycomb" arrangement instead of squares. Spacing for the latter was measured between parallel sides of the hexagons. The microembossed liner ridges had the same spacing as the engraved roll channels. The coating and lamination process was the same as in Example 9 for Pressure Sensitive Adhesive Solution 1 and Example 5 for Pressure Sensitive Adhesive Solution 7.

TABLE 4

Data for Examples 34–42

|  | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|
| PSA Solution or Resin | 1 | 7 | 1 | 7 | 1 | 1 | 1 | 1 | 1 |
| Grid Array | square | square | square | square | square | square | square | square | hexagon |
| Channel Spacing (mm) | 2.5 | 2.5 | 1.3 | 1.3 | 1.3 | 1.3 | 0.8 | 0.8 | 2.5 |
| PSA Channel Width (microns) | 150 | 120 | 130 | 140 | 80 | 105 | 130 | 105 | 500 bimodal |
| PSA Channel Depth (microns) | 20 | 18 | 20 | 10 | 15 | 7 | 20 | 19 | 16 |
| Slide Test Rating | 1 | 3.5 | 3.5 | 2.5 | 2 | 2 | 4 | 3.5 | 1 |
| Hot Application/ Reapplication Test Rating | "good" | "fair" | "good" | "good" | "good" | "good" | "good" | "good" | "good" |
| Indent Panel Test Rating | 3.5 | 3 | 3.5 | 4 | 4 | 4 | 3.5 | 3 | 4 |

Examples 43–49

A release liner consisting of paper (about 114 microns), polyethylene (about 25 microns) with a matte finish on the back side, polyethylene (about 25 microns) with a glossy finish on the front side, and a silicone coating on the glossy side was microembossed with small pits and the pits filled with fine glass beads as described in U.S. Pat. No. 5,362,516. The pits were about 100 microns diameter, 22 microns deep in a square lattice of 300 micron spacing. The liners were then embossed according to the methods of Examples 1–3 except that the liner of Example 43 was not microembossed and had no continuous ridges. The liners of Examples 45, 46, and 49 had ridge shapes similar to Examples 1–3 with the spacing and orientation indicated in Table 5 below. The liners of Examples 44, 47, and 48 had bimodal ridges with a groove down the center of the ridge that was not as deep as the ridge height at the edges of the ridge. For Examples 43–48, Pressure Sensitive Adhesive Solution 1 was coated onto the liner and dried at 66° C. and laminated to cast plasticized, white 46 micron PVC film. For Example 49, Pressure Sensitive Adhesive Solution 3 was used. Microscopy clearly showed both protruding mounds that provided slide feature and recessed crossing channels in the exposed pressure sensitive adhesive layers after removal of the liner. Examples 44, 47, and 48 showed bimodal channels with shallow center adjacent to deeper recesses. The average channel widths recorded include the combined distance between the outer edges, and the depths of the channels were determined from the deepest valley regions of the channels. The results are summarized in the following table:

TABLE 5

Data for Examples 43–49

| Example | 43 | 44 | 45 | 46 | 47 | 48 | 49 |
|---|---|---|---|---|---|---|---|
| Engraved Roll Temp (° C.) | — | 107 | 111 | 111 | 110 | 110 | 107 |
| Silicone Roll Temp (° C.) | — | 121 | 116 | 116 | 116 | 116 | 121 |
| Nip Force (N/mm) | — | 11 | 11 | 11 | 11 | 11 | 16.5 |
| Engraved Roll Channel Nominal Width (microns) | — | 76 | 51 | 51 | 127 | 127 | 76 |
| Ridge Angle from Roll Circumference (degrees) | — | 45 | 0 | 0 | 45 | 45 | 45 |
| Liner Ridge Width (microns).. | 0 | 150–160 | 100 | 100 | 250 | 250 | 150–160 |
| Liner Ridge Height (microns) | 0 | 18–20 | 10–18 | 10–15 | 15–20 | 15–20 | 15–20 |
| PSA Thickness (microns) | 32 | 30 | 48 | 33 | 41 | 30 | 25 |
| liner ridge/ PSA channel spacing (mm) | 0 | 0.77 | 0.77 | 0.77 | 1.27 | 1.27 | 0.77 |
| PSA Channel Depth (microns) | 0 | 14 | 14 | 9 | 10 | 13 | — |
| PSA Channel Width (microns) | 0 | 170 | 87 | 75 | 220 | 250 | — |
| Rivet Panel Test | 40 mm after 5 min. | 10 sec. | 20 sec | 30 sec | 25–30 sec | 30 sec | 20 sec |

TABLE 5-continued

Data for Examples 43–49

| Example | 43 | 44 | 45 | 46 | 47 | 48 | 49 |
|---|---|---|---|---|---|---|---|
| Air Bleed Test - 175 g/5 cm Roller (sec) | >3600 | <1 | 40 | — | 21 | — | — |
| Air Bleed Test - 1235 g/7.5 cm Roller (sec) | >173000 | <1 | 50 | — | 22 | — | 31 sec |
| Rivet/Corrugated Panel Test | poor | very good | fair-good | fair-good | fair | fair-good | — |

Examples 50–58

Laminated film constructions were prepared according to the general procedures of Examples 9 and 44 using a release liner made of either double-microembossed polyethylene coated poly(ethylene terephthalate) (PET) or polyethylene coated paper with a silicone release coating. The pressure sensitive adhesive and film was the same as that of Example 9. The pattern and orientation of the two sets of intersecting parallel ridges on the liner and corresponding microchannels of the pressure sensitive adhesive are indicated in the table below. Resulting pressure sensitive adhesive layer channel dimensions were changed either by changing the groove dimensions of the engraved plate used for embossing the release liner or by changing the embossing conditions (temperature and pressure). The results of the evaluations are shown in the table below.

TABLE 6

Data for Examples 50–58

| Example | 50 | 51 | 52 | 53 | 54 | 55 | 56 | 57 | 58 |
|---|---|---|---|---|---|---|---|---|---|
| Liner Type | PET | PET | PET | PET | PET | PET | PET | paper | paper |
| Pattern | square | square | square | square | square | square | square | diamond | square |
| Orientation* | 45° | 45° | 45° | 45° | 45° | 45° | 45° | 30° | 0° |
| Channel Spacing (mm) | 2.5 | 2.5 | 2.5 | 2.5 | 1.3 | 1.3 | 1.3 | 2.5 | 0.8 |
| PSA Channel Width (microns) | 120 | 110 | 100 | 90 | 100 | 95 | 110 | 450 (bimodal channel) | 75 |
| PSA Channel Depth (microns) | 12 | 11 | 8 | 7 | 7–11 | 6–9 | 5–8 | 10 | 6–9 |
| Peg Height (μm) | 5–9 | 7–9 | 7–10 | 6–10 | 10–13 | 8–10 | 10–13 | up to 16 | 13–18 |
| Hot Appl/Reappl Test | 2 | 1–2 | 1 | 1 | 2 | 2 | 2 | 1 | 2 |
| Indent Panel Test | 3 | 2 | 1–2 | 1 | 3 | 2–3 | 0 | 0 | 0–1 |
| Rivet Panel Test | — | — | — | — | 90 sec. | 120 sec. | 195 sec. | 20 sec. | 30 sec. |
| Slide Test | 1 | 2 | 2 | 2 | 2 | 2–3 | 1–2 | 1 | 1 |

*Orientation to Roll Circumference

Examples 59–66

The microridged liner of Example 9 was coated with Pressure Sensitive Adhesive Solution 1 as in Example 9 at different thicknesses as seen in Table 7, and laminated to 46 micron thick plasticized white PVC film. All showed good application properties regardless of the thickness of the adhesive. Surprisingly, the microchannels for fluid egress remained, regardless of the thickness of the adhesive.

TABLE 7

Data for Examples 59–66

| Example | 59 | 60 | 61 | 62 | 63 | 64 | 65 | 66 |
|---|---|---|---|---|---|---|---|---|
| Nominal Thickness of PSA 1 (microns) | 18 | 25 | 30 | 36 | 43 | 46 | 51 | 58 |

TABLE 7-continued

Data for Examples 59–66

| Example | 59 | 60 | 61 | 62 | 63 | 64 | 65 | 66 |
|---|---|---|---|---|---|---|---|---|
| Hot Appl/Reappl Test | "good" | "good" | "good" | "good" | "good" | "good" | "good" | "good" |

Example 67

Samples were cut from the liner/pressure sensitive adhesive/film constructions of Examples 9, 13, 18, 21, 24, 27, 29, and 32. Glass plates were cleaned with cleanser, rinsed with water, and dried with a paper towel. Pieces (7.5 cm by 7.5 cm) of the first set of film samples were cut, peeled away from the microridged release liner, and applied onto the glass using a 1235 g, 40 durometer, 7.5 cm wide rubber roller. The "channel" width not contacting the glass was determined by microscopic examination through the glass. The percent area represented by the open channels relative to the total sample contact area at the glass interface was calculated from the widths of the channels, the channel spacing, and the estimated percent of original channels still open. The glass plate panels with the adhered samples were placed in either 22° C., 50% relative humidity room (CTH) or in a 66° C. oven. After the indicated dwell times the channels were examined to see if most remained open and continuous, and the approximate area of channels was calculated. For these examples, as the calculated percent area dropped to about 5% or less, individual channels tended to close off in random fashion making area coverage difficult to measure. A 0% calculation indicates that essentially no channels were left.

TABLE 8

Data for Example 67

| | | | % Area as Open Microchannels at Glass Interface | | | | |
|---|---|---|---|---|---|---|---|
| Sample from | PSA | Film | 1 hr at CTH | 24 hr at CTH | 8 days at CTH | 24 hr at 66° C. | 8 days at 66° C. |
| Ex.9 | 1 | PVC (46 microns) | 14 | 11 | 11 | 11 | 11 |
| Ex. 13 | 1 | PET (48 microns) | 11 | 11 | 11 | 10 | 10 |
| Ex. 18 | 2 | PVC | 10 | <5 | 0 | 0 | 0 |
| Ex. 21 | 2 | PET | 11 | 5 | <1 | 0 | 0 |
| Ex. 24 | 4 | PVC | 12 | 12 | 12 | 7 | 0 |
| Ex. 27 | 4 | PET | 10 | 12 | 12 | 10 | <5 |
| Ex. 29 | 6 | PVC | 12 | 12 | — | 10 | 9 |
| Ex. 32 | 6 | PET | 12 | 12 | — | 11 | 10 |

Example 68

Samples were cut from the liner/pressure sensitive adhesive/film constructions of Examples 9, 13, 18, 21, 24, 29, and 32 (using 46 micron PVC or 48 micron PET films). Pieces were subjected to the Hot Application/Reapplication Test and the Slide Test and were recorded as the initial results. The microridged liners were removed and the film samples laminated onto relatively smooth silicone-coated paper release liner using a Vanquisher roll laminator at 200 kPa (30 psi) and a speed of about 2.5 cm/sec. Control samples retaining the microridged liner were also evaluated for Examples 18 and 24. The samples were placed in a 66° C. oven for 1 week and then removed from the oven to equilibrate to room temperature. The release liner was removed and the pressure sensitive adhesive was examined for the presence of essentially continuous interconnected microchannels. The samples were then subjected to the Slide Test and the Hot Application Test.

TABLE 9

Data for Example 68

| | | | Initial Results Prior to Liner Exchange | | | Liner-Exchanged Samples after 7 days at 66° C. | | | Controls with Microridged Liners after 7 days at 66° C. | | |
|---|---|---|---|---|---|---|---|---|---|---|---|
| Sample from | PSA | Film | Slide Test Rating | Channels Present? | Hot App/ Reapp Test Rating | Slide Test Rating | Channels Present? | Hot App./ Reapp. Test Rating | Slide Test Rating | Channels Present? | Hot App./ Reapp. Test Rating |
| Ex. 9 | 1 | PVC | 1–2 | Yes | "good" | 4 | Yes | "good" | — | — | — |
| Ex. 13 | 1 | PET | 2 | Yes | "good" | 4 | Yes | "good" | — | — | — |
| Ex. 18 | 2 | PVC | 1–2 | Yes | "good" | 4 | No | "poor" | 1 | Yes | "good" |
| Ex. 21 | 2 | PET | 1–2 | Yes | "good" | 4 | No | "poor" | — | — | — |
| Ex. 24 | 4 | PVC | 3 | Yes | "good" | 4 | No | "poor" | 1 | Yes | "good" |
| Ex. 29 | 6 | PVC | 2 | Yes | "good" | 4 | Yes | "good" | — | — | — |
| Ex. 32 | 6 | PET | 2 | Yes | "good" | 4 | Yes | "good" | — | — | — |

Examples 69–72

Pressure Sensitive Adhesive Solution 9 and Pressure Sensitive Adhesive Solution 10 were each coated separately onto the microridged release liner described in Example 9 and dried at 66° C. for 10 minutes to afford corresponding pressure sensitive adhesive layers of 37 microns and 32 microns thickness. A 46 micron plasticized white PVC film was laminated onto the exposed pressure sensitive adhesive surfaces. Control samples were similarly prepared using the liner of Example 10 with only filled first-emboss pits. The data in the table below indicate improved application performance of the examples of the invention relative to the control samples.

TABLE 10

Data for Examples 69–72

| Ex. | PSA Solution | Liner with Second Emboss Ridges | Slide Test Rating | Hot App/Reapp Test Rating | Indent Panel Test Rating | Rivet Panel Test Results |
|-----|--------------|--------------------------------|-------------------|---------------------------|--------------------------|--------------------------|
| 69  | 9            | Yes                            | 2                 | "good"                    | 1–2                      | 20 sec.                  |
| 70  | 9            | No                             | 2                 | "poor"                    | 0                        | 36 mm after 5 min.       |
| 71  | 10           | Yes                            | 3                 | "fair"                    | 1                        | 20 sec.                  |
| 72  | 10           | No                             | 3                 | "poor"                    | 0                        | 36 mm after 5 min.       |

Example 73

A release liner having no first-emboss pits was prepared with an array of microridges as described in Examples 1–3. The microridges were spaced 1.27 mm apart, were about 110 micron wide, and about 15 microns high. A translucent graphic marking construction was prepared by coating the microridged liner with Pressure Sensitive Adhesive Solution 8, drying at 66° C. for 10 minutes to afford a 33 micron thick layer, and laminating a 50 micron red translucent vinyl film (such as used in Scotchcal™ Translucent Film Series 3630-33) onto the exposed surface of the pressure sensitive adhesive layer. A control was prepared using the liner of Example 4. The resulting constructions were peeled from the release liner and applied with a PA-1 Hand Applicator onto clear polycarbonate panels. The control sample had bubbles and appeared nonuniform, particularly when viewed from the polycarbonate side while illuminated from the film side. The sample of the current invention appeared uniform and visually acceptable. The samples were placed in a 93° C. oven for 5 minutes. No change was seen in the sample of the current invention, while the control sample showed more bubbles. Other samples on polycarbonate were placed in a 66° C. oven for 3 days. Again the sample of the current invention appeared uniform, while the control sample showed large blisters.

Example 74

The film constructions of Examples 18–23 were cut into 2.5 cm×7.5 cm pieces. Each piece was loosely, but evenly draped onto a clean 40° C. glass hot plate and the edges were pressed with a finger with approximately 500 g "force" to uniformly contact the periphery (from the edge to about 0.5 cm inward) to the glass plate. (This was the same procedure used to set up the Hot Application/Reapplication Test). Each sample was then allowed to remain on the hot plate without additional application pressure. The pressure sensitive adhesive layer was allowed to wet out onto the glass plate to provide contact for the remainder of the sample. Large air bubbles were trapped in the control samples without microchannels in the pressure sensitive adhesive layer and prevented the samples from bonding uniformly and flat onto the glass plate. Samples with microchannels in the pressure sensitive adhesive layer wet out flat and bonded uniformly onto the glass plate after a dwell time of less than 10 minutes.

Examples 75–77

Samples were prepared according to the method in Examples 38, 39 and 10 respectively. 2.54 cm by 18 cm strips of material were cut from of the sample with the long dimension of the strip corresponding to the machine direction of the sample. Approximately 7.6 cm of the liner was removed from a strip, and the adhesive side was applied to rigid substrates using a 3M PA-1 Hand Applicator. The application technique is more representative of actual field technique for applying image graphics. The substrates were Alodine Al, Fruehauf white painted Al, 3M™ Controltac™ Plus Graphic Marking Films Series 180-10 Mounted on Al, and 3M™ 9720 UV Ink printed on 3M™ Controltac™ Plus Graphic Marking Films Series 180-10 Mounted on Al. Data are given in Table 11. The results show that essentially the same peel adhesions were obtained for samples with microchanneled PSA and control samples.

TABLE 11

Data for Examples 75–77

| Substrate | Dwell Conditions | Peel Force per 2.5 cm Width/Std. Deviation (N) | | |
|-----------|------------------|--------|--------|-----------------|
|           |                  | Ex. 75 | Ex. 76 | Control Ex. 77  |
| Aluminum  | No aging         | 36/3   | 36/3   | 37/1            |
| Aluminum  | 21° C., 24 hr.   | 38/1   | 39/2   | 40/2            |
| Aluminum  | 66° C., 7 days   | 40/1   | 39/1   | 40/4            |
| Aluminum  | 32/90% RH, 14 days | 38/1 | 39/4   | 39/1            |
| Painted Aluminum | No aging  | 24/1   | 24/2   | 25/1            |
| Painted Aluminum | 21° C., 24 hr. | 28/1 | 29/1 | 29/1            |
| Painted Aluminum | 66° C., 7 days | 33/1 | 32/3 | 35/1            |
| Painted Aluminum | 32° C./90% RH, 14 days | 29/1 | 28/3 | 30/1 |
| Controltac ™ Plus Film | No aging | 24/1 | 26/2 | 24/1       |
| Controltac ™ Plus Film | 21° C., 24 hr. | 30/1 | 28/1 | 26/1 |
| Controltac ™ Plus Film | 66° C., 7 days | 21/3 | 21/1 | 21/2 |
| UV ink coated Controltac ™ Plus Film | No aging | 12/1 | 12/2 | 12/1 |
| UV ink coated Controltac ™ Plus Film | 21° C., 24 hr. | 21/1 | 19/1 | 21/1 |
| UV ink coated Controltac ™ Plus Film | 66° C., 7 days | 28/1 | 28/1 | 28/4 |

Examples 78–83

Samples were prepared according to Examples 38, 39 and 10 respectively, except that for Examples 78, 79, and 80 the film laminated to the coated liner was reflective sheeting used in 3M™ Scotchlite™ Reflective Sheeting Series 580. For Examples 81, 82, and 83, the film used was reflective sheeting used in 3M™ Scotchlite™ Reflective Sheeting Series 690. A sample of each reflective construction was bonded to an aluminum panel that had been freshly painted with a two-part urethane paint. The paint had been deliberately undercured. The painted panels with the film on were allowed to age and cure overnight, which allowed the urethane paint to release $CO_2$. After 24 hours, the number of blisters that had formed under the film construction were counted. An excellent result would be zero blisters. The data are shown in the following table. The outgassing test results show that the samples with microchanneled pressure sensitive adhesive layer afforded excellent results, while the control samples showed blistering.

TABLE 12

Data for Examples 78–83

| Example: | 78 | 79 | 80 | 81 | 82 | 83 |
|---|---|---|---|---|---|---|
| Preparation: | Ex. 38 | Ex. 39 | Ex. 10 | Ex. 38 | Ex. 39 | Ex. 10 |
| Ridged Liner | Yes | Yes | No | Yes | Yes | No |
| Reflective Film Series | 580 | 580 | 580 | 680 | 680 | 680 |
| Blisters per $m^2$ | 0 | 0 | 4500–8000 | 0 | 0 | 4500–8000 |

Example 84

A film construction of Example 9 was subjected to the Cold Application Test. For comparison, a control without microchannels was tested. Films of the invention can be applied at lower temperatures without sacrificing appearance of the marking. The data are summarized in Table 13.

TABLE 13

Data for Example 84 and Control

| Application Temp (° C.) | Application Mass (kg) | Cold Application Test Ex. 84 | Cold Application Test Control |
|---|---|---|---|
| 10 | 6 | 1 | 2 |
| 10 | 4 | 1 | 3 |
| 10 | 2 | 1 | 7 |
| 4.4 | 6 | 1 | — |
| 4.4 | 4 | 1 | 5 |
| 4.4 | 2 | 1 | — |

Example 85

A 12.7 cm×3.8 cm sample of Example 48 was applied to a sealed 500 ml Nalgenem polyethylene bottle (Nalge of Rochester, N.Y.) containing gasoline. Even after 2 weeks, no gasoline outgassing blisters had formed under the sample, while large blisters had formed under a control sample of 3M™ Controltac™ Plus Series 180 film (having no recessed channels in the pressure sensitive adhesive layer). Samples of Examples 71 and 72 (50 cm by 75 cm) were tested in a similar manner. After 3 days the sample of Example 71 showed only one large blister and a few smaller blisters while the control sample of Example 72 showed many large blisters.

Examples 86–89

The next four examples show versatility of the use of products of the invention in various imaging processes.

Example 86

A sample of Example 36 was printed using the Scotchprint™ hot lamination process. A preprinted 3M™ Scotchprint™ 8601 Transfer Media was placed print side down onto the vinyl film. The sandwich of microembossed liner, adhesive, 46 micron vinyl film and printed silicone paper was fed through a Scotchprint™ Model "C" hot laminator (3M Co.). The conditions of the laminator were: temperature 96° C., gauge pressure of 440 kda, and a feed rate of about 1 cm per second. Once through the laminator, the silicone paper was peeled off leaving the color image bonded to the vinyl film. Subsequent WYCO RST data showed that the microchannels in the pressure sensitive adhesive layer had a nominal width of 80 microns, and an average depth of 14 microns. This data indicated that the hot lamination process did not significantly alter shape or dimensions of the microchannels. The imaged vinyl film construction had a Hot Application/Reapplication Test rating of "good." Further, the microchannels did not adversely affect the transfer process or aesthetics of the imaged graphic.

Example 87

A pressure sensitive adhesive backed graphic film of Example 9 (about 25 cm by 30 cm) was screen printed using a 390 mesh screen with 3M™ Scotchcal™ UV Screen Printing Ink Series 9700, focus cured with an American Ultraviolet Co. exposure unit (Murray Hill, N.J.) at 0.168 J/sq. cm., screenprinted with an overprint clear, and cured again. The resulting imaged graphic showed excellent visual appearance. Samples of the imaged graphic were evaluated and had excellent application properties. The Slide Test rating was 2, the Hot Application/Reapplication Test rating was "good", the Indent Panel Test rating was 4, and the Rivet Panel Test required only 25 seconds.

Example 88

This example was prepared according to the procedures of Example 9 except that a 58 micron white PET ink jet imageable film having the same ink jet receptor coating as 3M™ Scotchprint™ 8501 Clear Ink Jet Film was used. The construction was imaged on a Hewlett Packard Design Jet 755 CM ink jet printer with settings of "Best" and "Clear Film Mode." An acceptable color image was produced. The film was evaluated and gave a Hot Application/Reapplication Test rating of "good" and a Slide Test Rating of 3.

Example 89

Letters (3 and 4 cm tall) were cut into the pressure sensitive graphic film of Example 9 on a flatbed knife cutter. The weight was set so that the knife also made a slight surface cut into the release liner. The area around the letters (weed) was easily removed. Prespace tape (3M™ SCPS-2) was laminated by hand onto some of the film letters. The liner was removed, and the film letters with prespace tape adhered applied onto clear, smooth polycarbonate panel by hand without a plastic squeegee. (This process in usual practice results in poorer application.) The prespace tape was peeled off and the letters were pressed down by hand to afford a uniform application with no observable bubbles trapped under the letters. In a process that usually would afford poor application results, letters were also applied without using the prespace tape. Again, uniform contact of the pressure sensitive adhesive against the panel was achieved, resulting in applied markings that were uniformly applied. Also, no bubbles were formed after the panel was placed in a 66° C. oven for 2 hours.

Example 90

The general procedure of Examples 1–3 was used to emboss the polycoated PET release liner with a metal roll having an engraved pattern of parallel non-intersecting 90 degree V-grooves (1.3 mm apart) oriented parallel to the circumference of the roll. This afforded a release liner with triangular ridges about 80 microns wide and 17 microns high. Pressure Sensitive Adhesive 1 was coated onto the liner and laminated to 46 micron white plasticized PVC as described in Examples 1–3 to afford a smooth film construction. After removal of the liner, the pressure sensitive adhesive layer had parallel V-groove microchannels about 85 microns wide and 17 microns deep. Evaluation of the film construction gave a Slide Test rating of 4, a Hot Application/Reapplication Test rating of "good" with the microchannels oriented across or down the length of the strip, an Indent Panel Test rating of 3, and a Rivet Panel Test time of 85 seconds. During the Indent Panel Test a soap solution was applied around the periphery of the sample. Fine bubbles, indicative of air escape, formed at the two edges of the sample connected by the microchannels to the circular indent.

Example 91

The procedures of Example 90 were repeated, but the release liner microembossed was the polycoated paper liner described in Examples 43–49 with filled first-microembossed pits. The measured pressure sensitive adhesive microchannels were about 86 microns wide and 18 microns deep, and the protruding posts were about 14 microns high. Evaluation of the film construction gave a Slide Test rating of 1, a Hot Application/Reapplication Test rating of "good" with the microchannels oriented across the strip, a rating of "fair" with the microchannels oriented down the length of the strip, an Indent Panel Test rating of 3, and a Rivet Panel Test time of 90 seconds.

Example 92

A polycoated paper release liner, similar to the release liner microembossed in Example 44 except that the first-emboss pits were not filled with glass beads, was microembossed to afford continuous intersecting microridges 1.3 mm apart, about 100 microns wide, about 17 microns high, and oriented 45 degrees to the circumference of the roll in a square grid array. The film construction was prepared from this liner by the procedure of Example 44. Surprisingly, analyses showed both recessed microchannels and protruding pegs of pressure sensitive adhesive. The sample showed positionability at room temperature and a Slide Test rating of 3. The Hot Application/Reapplication Test rating was "good", the Indent Panel Test rating was 3–4, and the Rivet Panel Test time was 20 seconds.

Example 93

A film construction was prepared as described in Example 9 except a 13 micron flexible polyethylene film (the backing for Tegaderm™ tape from 3M) was laminated onto the pressure sensitive adhesive layer on the double-microembossed release liner. A control sample without microridges in the liner (no microchannels in the pressure sensitive adhesive) was prepared using the same film. Samples 5 cm by 5 cm were adhered onto the skin of a person's back. After completion of a strenuous sweat-producing workout, the samples were examined for water accumulation 5 minutes later and rated on a scale of 1–5 with 1 being the best. The sample with microchanneled pressure sensitive adhesive had a rating of 2. The control sample had a rating of 5 and showed water blisters between the pressure sensitive adhesive layer and the skin.

Examples 94–96

Highland™ Brand 3565 box sealing tape (polypropylene film with a rubber resin PSA from 3M) was laminated onto the doubly microembossed microridged release liner of Example 9 using a roll laminator with a Shore A 85 durometer rubber roll at room temperature and a smooth metal backup roll at a temperature of about 93° C., a nip force of 16 N/mm, and speed of one meter/minute. In similar fashion, the tape was laminated to two types of control release liners without microridges: one having the same liner material with only filled pits of the first emboss (Example 95), and one having no first-emboss pits (Example 96). The results are shown in the following table:

TABLE 13

Data for Examples 94–96

| Example | Microchannels in PSA | Protruding Pegs in PSA | Slide Test Rating | Hot Application/Reapplication Test Rating | Rivet Panel Test |
|---|---|---|---|---|---|
| 94 | Yes | Yes | 1–2 | "good" | 75 seconds |
| 95 | No | Yes | 1 | "poor" | 34 mm after 5 min. |
| 96 | No | No | 4 | "poor" | — |

Example 97

A sample of 3M™ Controltac™ Plus Graphic Marking Film was placed filmside down onto a glass plate. A wooden stylus was pressed into the liner side to scribe two sets of intersecting parallel lines (square grid array) about 1.6 mm apart in a manner as generally described in Example 1 of U.S. Pat. No. 5,268,228 (Orr). The film side of the laminate showed visible protruding ridges. The sample was applied onto a glass plate at room temperature and applied in a process similar to the Hot Application/Reapplication Test. Air bubbles were trapped in the sample and many channels were sealed. More bubbles formed after 16 hour dwell at room temperature.

Examples 98–100

Example 98 was made using a shape memory pressure sensitive adhesive consisting of 90 parts isooctyl acrylate, 10 parts acrylic acid, 0.05 parts hexanediol diacrylate, 0.30 parts Irgacure 651 photoinitiator from Ciba-Geigy (Hawthorne, N.Y.) and 4 parts of poly(octadecyl acrylate) prepared and cured between a smooth release liner and a 50 micron PET film backing by the method disclosed in U.S. patent application Ser. No. 08/660,219 (Silver et al.) filed Jun. 3, 1996 to make a tape with about 120 microns of shape memory pressure sensitive adhesive on a backing.

The smooth release liner was removed from the tape and an embossed release of Example 39 was used to emboss the free surface of the adhesive by pressing the warm adhesive against the room temperature embossed release liner in a WG36 laminator (Robert L. Greig Co., Stoughton, Wis.) with the top roll at 65° C. and the bottom roll at 25° C.. The tape had a 90° wrap around the top roll and the embossed liner had no wrap on either roll. The air pressure on the runs was set at 80 psi (550 kPa). Examination of the tape showed a pattern of microchannels in the adhesive surface and posts above the surface corresponding to the pattern of the release liner. The dimensions were not measured. The Hot Application/Reapplication Test gave a "fair" rating when done quickly. A sample heated to about 40–43° C. for 10 mins. lost the embossed topography and had a Hot Application/Reapplication Test rating of, "poor". A sample tested at 25° C. had a rating of "good". The Slide Test Rating was 2 to 3.

Example 99 was identical to Example 98 except an embossed release liner from Example 73 was used. Test results were the same as in Example 98, except the Slide Test Rating was 4.

Example 100 was identical to Example 98 except a nonwoven fabric (as used in 3M™ Micropore™ tape, silicone release coated) was used as a microembossing tool. The release coated nonwoven fabric made a random pattern of microchannels on the adhesive surface. The sample gave a "good" rating on the Hot Application/Reapplication Test when performed at 25° C. But when heated to 40–43° C., the microchannels disappeared and the Hot Application/Reapplication Test rating was "poor". These thermomorphic adhesives show how an adhesive topography can be controlled in the fourth dimension: an effective period of time.

Example 101

The general procedure of Examples 1–3 was used to prepare both silicone coated polycoated PET and polycoated paper release liners having a parallel array of triangular ridges about 4–6 microns high and 54 microns wide spaced 1.3 mm apart. These liners were placed onto the adhesive side of 3M™ Scotchcal™ Heat Activated Translucent Film Series 825 and passed through a hot nip laminator at 93° C., 30 cm/min, and 1.7 N/cm nip force. Sheets (about 30 cm by 60 cm) of the resulting microchanneled material and of control material without microchannels were placed adhesive side down onto 3M™ Panaflex™ Substrate Series 945 GPS in a hot laminating vacuum applicator bed at 46° C., and the vacuum diaphragm was closed. After a 5 minute vacuum cycle, the temperature was increased to 93° C. for 2 minutes. The control film exhibited significant air entrapment caused by the edge of the tacky film becoming adhered to the substrate during initial application prior to removal of air from under the sample. The sample with microchannels showed no air entrapment, and the appearance of the applied film on the substrate was not perceptibly altered by the presence of air release channels.

The invention is not limited to the above embodiments. The claims follow.

What is claimed is:

1. A method of controlling the topography of an adhesive surface, comprising:

contacting a microembossed pattern which is a surface having an effective three-dimensional pattern that generates a maximum difference of less than 45 µm in surface planar dimension in a continuous adhesive to a layer of adhesive and forming a continuous pressure sensitive adhesive surface having a topography in at least one major, substantially continuous surface that is essentially the inverse of the microembossed pattern to which the adhesive surface is contacted, such that when an adhesion interface is established between the layer of adhesive and a supporting substrate, the adhesive has a contact area of at least 35%. and fluid may be exhausted from the plane of the adhesion interface.

2. The method according to claim 1, wherein the contacting step is selected from the group consisting of casting techniques, coating techniques, and compressing techniques.

3. The method according to claim 2, wherein the contacting step is a casting technique comprising using a tool having a microembossed pattern.

4. The method according to claim 2, wherein the contacting step is a coating technique comprising coating an adhesive onto a release liner having a microembossed pattern.

5. The method according to claim 2, wherein the contacting step is a compressing technique comprising passing through a nip roll to compress pressure sensitive adhesive against a release liner.

6. The method according to claim 3, wherein the microembossed pattern on the tool is formed by etching, photolithography, stereolithography, micromachining, knurling, scoring or cutting.

7. The method according to claim 1, wherein the surface is at least one major surface.

8. The method according to claim 1, further comprising contacting a major, opposing surface of the adhesive.

9. The method according to claim 1, wherein the microembossed pattern resides on a release liner.

10. The method according to claim 1, wherein the microembossed pattern resides on a tape backing.

11. The method according to claim 1, wherein the microembossed pattern comprises two or more embossing patterns to create a complex pattern of differing depths or heights of embossing to form the microreplicated adhesive having a complex pattern of differing depths or heights.

12. The method according to claim 11, wherein different types of materials are introduced into recesses of differing depths of the complex pattern.

13. An article comprising a layer of pressure sensitive adhesive having an adhesive surface having a topography in at least one major, continuous surface having a three-dimensional pattern with a maximum difference of less than 45 µm in surface planar dimension, such that when an adhesion interface is established between the adhesive surface and a supporting substrate, the adhesive has a contact area of at least 35%, and fluid may be exhausted from the plane of the adhesion interface.

14. The article according to claim 13, wherein the topography of the adhesive surface has a complex pattern of differing depths or heights.

15. The article according to claim 13, wherein different types of materials reside on the adhesive surface.

16. The article according to claim 13, further comprising a supporting substrate and an interface between the supporting substrate and the adhesive surface, wherein the topography of the adhesive surface allows exhaustion of fluids from the plane of the adhesion interface.

17. The article according to claim 13, wherein the adhesive layer further comprises topography on a major, opposing adhesive surface of the adhesive layer, said opposing surface topography having a three-dimensional pattern with a maximum difference of less than 45 µm in surface planar dimension, such that when an adhesion interface is established between the opposing adhesive surface and a supporting substrate, the adhesive has a contact area of at least 35%, and fluid may be exhausted from the plane of the adhesion interface.

18. An article comprising a layer of pressure sensitive adhesive having a topography in at least one major, continuous surface having a three-dimensional pattern with a maximum difference of less than 45 µm in surface planar dimension formed from at least two embossing patterns, such that when an adhesion interface is established between the adhesive surface and a supporting substrate, the adhesive has a contact area of at least 35%, and fluid may be exhausted from the plane of the adhesion interface.

19. The article according to claim 18, wherein the adhesive surface having topography has a complex pattern of differing depths or heights.

20. The article according to claim 18, wherein different types of materials reside on the adhesive surface.

21. The article according to claim 18, further comprising a supporting substrate and an interface between the supporting substrate and the adhesive surface, wherein the topography of the adhesive surface allows exhaustion of fluids from the plane of the adhesion interface.

22. The article according to claim 18, wherein the adhesive layer further comprises topography on a major, opposing surface of the adhesive layer, said opposing surface topography having a three-dimensional pattern with a maximum difference of less than 45 $\mu$m in surface planar dimension, such that when an adhesion interface is established between the opposing adhesive surface and a supporting substrate, the adhesive has a contact area of at least 35%, and fluid may be exhausted from the plane of the adhesion interface.

23. A method of making a microreplicated adhesive surface using a release liner having a microembossed pattern, comprising the steps of:
  (a) contacting the microembossed pattern which is a surface having an effective three-dimensional pattern that generates a maximum difference of less than 45 $\mu$m in surface planar dimension in a continuous adhesive to a layer of pressure sensitive adhesive and
  (b) forming a pressure sensitive adhesive surface having a topography in at least one major, substantially continuous surface that is essentially the inverse of the microembossed pattern to which the adhesive surface is contacted and having a contact area of at least 35%.

\* \* \* \* \*

UNITED STATES PATENT AND TRADEMARK OFFICE
CERTIFICATE OF CORRECTION

PATENT NO. : 6,197,397 B1
DATED : March 6, 2001
INVENTOR(S) : Frank T. Sher et al.

It is certified that error appears in the above-identified patent and that said Letters Patent is hereby corrected as shown below:

<u>Column 19,</u>
Line 20, Example 15, column 3, insert -- polyolefin --.

<u>Column 29,</u>
Line 45, delete "Nalgenem" and insert therefore -- Nalgenem$^{TM}$ --.

<u>Column 30,</u>
Line 3, delete "kda" and insert therefore -- kpa --.

<u>Column 34,</u>
Line 18, after the word "further", delete the word "comprising".

Signed and Sealed this

Twenty-first Day of January, 2003

JAMES E. ROGAN
*Director of the United States Patent and Trademark Office*